United States Patent [19]

Terada et al.

[11] Patent Number: 4,918,644
[45] Date of Patent: Apr. 17, 1990

[54] SYSTEM CONTAINING LOOP SHAPED TRANSMISSION PATHS FOR TRANSMITTING DATA PACKETS USING A PLURALITY OF LATCHES CONNECTED IN CASCADE FASHION

[75] Inventors: Hiroaki Terada, Osaka; Katushiko Asada, Hyoko; Hiroaki Nishikawa, Osaka; Souichi Miyata; Satoshi Matsumoto, both of Nara; Hajime Asano, Osaka; Masahisa Shimizu, Osaka; Hiroki Miura, Osaka; Kenji Shima; Shinji Komori, both of Hyogo, all of Japan

[73] Assignees: Sanyo Electric Co., Ltd.; Sharp Kabushiki Kaisha; Matsushia Electric Industrial Co., Ltd., all of Osaka; Mitsubishi Denki Kabushiki Kaisha, Tokyo, all of Japan

[21] Appl. No.: 868,291

[22] Filed: May 28, 1986

[30] Foreign Application Priority Data

| May 31, 1985 | [JP] | Japan | 60-119165 |
| May 31, 1985 | [JP] | Japan | 60-119166 |
| May 31, 1985 | [JP] | Japan | 60-119167 |
| May 31, 1985 | [JP] | Japan | 60-119168 |
| May 31, 1985 | [JP] | Japan | 60-119169 |
| Mar. 12, 1986 | [JP] | Japan | 61-55948 |

[51] Int. Cl.⁴ ............ G06F 7/04; G06F 7/20; G06F 7/32
[52] U.S. Cl. .................................................. 364/900
[58] Field of Search ... 364/200 MS File, 900 MS File

[56] References Cited

U.S. PATENT DOCUMENTS

| 4,128,882 | 12/1978 | Dennis | 364/200 |
| 4,130,885 | 12/1978 | Dennis | 364/200 |
| 4,153,932 | 5/1979 | Dennis et al. | 364/200 |
| 4,644,461 | 2/1987 | Jennings | 364/200 |
| 4,675,847 | 6/1987 | Birnbaum et al. | 365/183 |

OTHER PUBLICATIONS

Hwang et al., *Computer Architecture and Parallel Processing*, McGraw Hill, 1984, ch. 10.

*Primary Examiner*—Raulfe B. Zache
*Assistant Examiner*—A. Mohamed
*Attorney, Agent, or Firm*—Darby & Darby

[57] ABSTRACT

A data processing apparatus includes two data transmission paths formed likewise in a loop fashion. These data transmission paths include a plurality of latch registers connected in a cascade fashion respectively and are constituted as a so-called self-running type shift register wherein each data word constituting a data packet is shifted in sequence provided that a pre-stage register is vacant. Data packets are transmitted in the directions reverse to each other on the two loop-shaped data transmission paths an identification data included in each data packet being transmitted is detected in a section defined as a data packet pair detecting section. The detected identification data are compared in a comparing circuit and, one new data packet is produced from the two data packets in a manner that a data packet is joined from one data transmission path to the other data transmission path.

23 Claims, 18 Drawing Sheets

LEGENDS { ○ JOINING PART
         □ BRANCHING PART

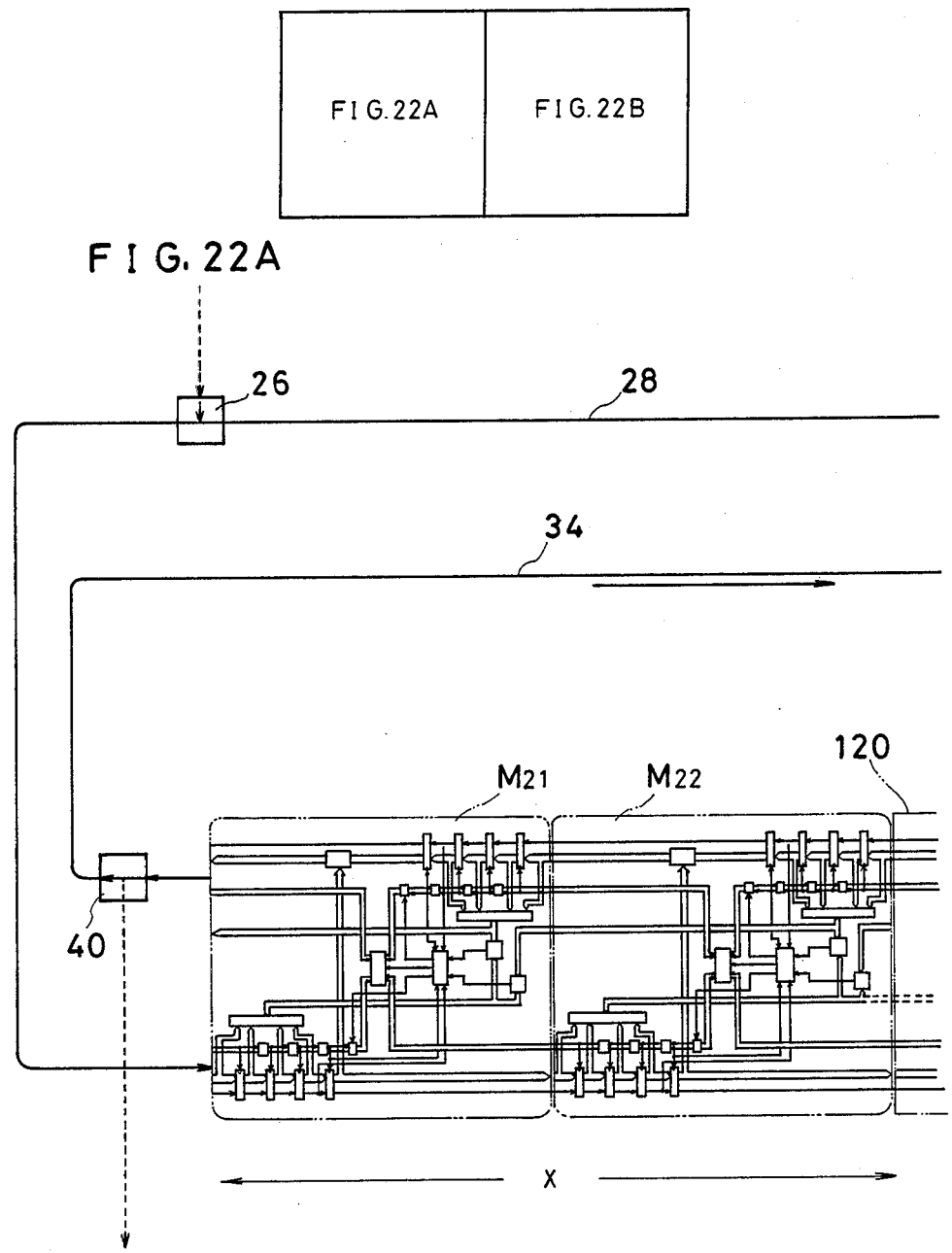

SYSTEM CONTAINING LOOP SHAPED TRANSMISSION PATHS FOR TRANSMITTING DATA PACKETS USING A PLURALITY OF LATCHES CONNECTED IN CASCADE FASHION

BACKGROUND OF THE INVENTION

1. Field of the Invention

The present invention relates to a data processing apparatus. More specifically, the present invention relates to a data processing apparatus which produces one new data packet from two data packets as is the case of a firing part of a data-driven type data processing apparatus.

2. Description of the Prior Art

The Neumann type data processing apparatus has deficiencies such as a low processing speed and a difficulty in parallel processing due to sequential processing. Then, recently, the data-driven type (data-flow type) data processing apparatus has been proposed and realized. An example of such a data-driven type data processing apparatus is disclosed, for example, at pages 181 through 218 of the magazine "Nikkei Electronics" issued on Apr. 9, 1984.

In the conventional system, a data packet is stored in a queuing memory from a data bus to detect a firing and an identification element or identification data of the data packet stored in this queuing memory is searched and thereby a counterpart data packet to be paired is found.

In the conventional system, the data packet is stored in the queuing memory and all identification data therein are searched and therefore an extremely long time is required to detect a firing, resulting in the speed of the whole data processing apparatus being reduced.

SUMMARY OF THE INVENTION

Therefore, the principal object of the present invention is to provide a novel data processing apparatus.

Another object of the present invention is to provide a data processing apparatus capable of processing at a higher rate.

A further object of the present invention is to provide a data processing apparatus capable of finding faster the counterpart data packet to be paired.

A still further object of the present invention is to provide a data processing apparatus causing less detection errors.

The other object of the present invention is to provide a data processing apparatus capable of securing time enough to compare identification data.

To be brief, the present invention is of a data processing apparatus which provides first and a second data transmission paths for transmitting data packets containing identification data which are constituted by using a plurality of latching means connected in a cascade fashion, an identification data detecting means connected to the first and the second data transmission paths for detecting the identification data comprised in the data packets transmitted thereon respectively, a determining means to compare the identification data detected by the identification data detecting means for determining the data packets being transmitted on the first and the second data transmission paths are to be paired and a new data packet producing means for producing one new data packet from the two data packets determined by the determining means.

The data packets are transmitted individually on the first and the second data transmission paths respectively. The identification data detecting means extracts the identification data from the data packets transmitted on the respective data transmission paths. The determining means compares the two identification data extracted in such a manner and finds the data packets to be paired which are transmitted on the two data transmission paths, for example, by detecting a coincidence of the both. When the counterpart data packet to be paired is detected, this data packet is given to the new data packet producing means from the first and the second data transmission paths. The new data packet producing means processes the two data packets to be given in a predetermined manner, producing one new data packet.

In accordance with the present invention, the data packets to be paired are detected while the data are transmitted on the first and second data transmission paths and therefore the new data packet can be produced faster in comparison with the conventional system of using the queuing memory. For this reason, a system having a higher speed of the whole data processing apparatus can be constituted.

Also, if a self-running type shift register is used as such a data transmission path, coupling with an asynchronous type main data transmission path can be facilitated and in the case where the configuration is made as a data-driven type data processing apparatus, a more effective advantage thereof is obtainable.

In accordance with a preferred embodiment of the present invention, the first and the second data transmission paths are constituted in a loop fashion so as to transmit the data packets comprising identification data in the directions reverse to each other. Accordingly, the data packets are transmitted individually and in the directions reverse to each other on the first loop-shaped data transmission path and the second loop-shaped data transmission path. In accordance with this embodiment, the data packets to be paired are detected while the data are transmitted in the directions reverse to each other on the loop-shaped data transmission paths and therefore detection of the identification data can be made even faster.

In another embodiment in accordance with the present invention, in association with one of the first and the second data transmission paths, single or a plurality of data packet pair detecting sections are defined and in association with the other data transmission path, a plurality of data packet pair detecting sections are defined. Then, the identification data comprised in the data packets are detected in the respective data packet pair detecting sections. In accordance with this embodiment, a plurality of data packet pair detecting sections are defined at least in one of the first and the second data transmission paths and therefore no "deadlock" takes place which is caused by a "pass-each-other" of data on the data transmission paths.

In a data processing apparatus in accordance with the present invention, the identification data is detected while the data packets are transmitted on the data transmission paths, and determination on a pair has to be made based on the identification data and the time required for comparing becomes too short depending on the speed of data transfer and thereby a detection error conceivably takes place.

Then, in still another embodiment in accordance with the present invention, identification data detecting means provides a first and a second identification data extracting means which extract identification data transmitted on the first and the second data transmission paths and a holding means for holding the identification data extracted by the first and the second identification data extracting means for a predetermined time. Then, a comparing means compares the two identification data held in this holding means. In accordance with this embodiment, the extracted data are held for the predetermined time and therefore a time enough to compare can be secured even if the transmitting speed of the data transmission path is high accordingly, there is no possibility of occurance of a detection error.

In a further embodiment in accordance with the present invention, the new data packet producing means comprises a joining means for producing a new data packet in a manner that a data packet is joined from one of the first and the second data transmission paths to the other thereof. In accordance with this embodiment, data packets are joined on the two data transmission paths, and therefore a special data transmission path for the newly produced data packet can be dispensed with.

In this embodiment, if a branch output part taking out the new data packet exists only on one of the data transmission paths, the following various problems to be solved are raised. More specifically, a time from production to output of the new data packet becomes longer on an average. This is remarkable particularly in the case where a large number of data packet pair detecting sections are installed. Also, since the new data packet is transmitted only on one of the data transmission paths, data packets of different kinds are placed in a mixed fashion and are transferred only on that data transmission path when the data transmission path of the output side which branches the new packet is crowded and it becomes difficult to branch the new data packet, therefore an imbalance of the amount of data occurs that only the operand packet to be inputted to this data transmission path is difficult to be inputted. Furthermore, since only one branching part is present, the rate of outputting the new data packets is limited by the ability of the above-described branching part even if production of the new data packet is performed at a high processing rate in a parallel fashion by a large number of firing parts of data packet pair detecting sections and therefore it is difficult to carry out data processing at a higher speed.

Then, in another embodiment in accordance with the present invention, a plurality of data packet forming means are installed and at least two data packet extracting means for extracting the new data packet formed by a plurality of data packet forming means are installed. Accordingly, the new data packet formed by the data packet forming means is extracted from any one of at least two data packet extracting means. In accordance with the present invention, since two or more means for extracting the new data packet are installed, the rate of outputting the new data packet is scarcely limited by the state of processing at that output part and as a whole, a higher processing rate can be expected. By extracting the new data packets respectively from the two data transmission paths as described above, no imbalance takes place that the input of the data packet to one of the data transmission paths is limited and also in this point, an uniform and higher rate of processing is made possible.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 22, comprising FIGS. 22A and 22B, is a block diagram showing a preferred embodiment embodying FIG. 21 embodiment.

DESCRIPTION OF THE PREFERRED EMBODIMENTS

Figure 1:
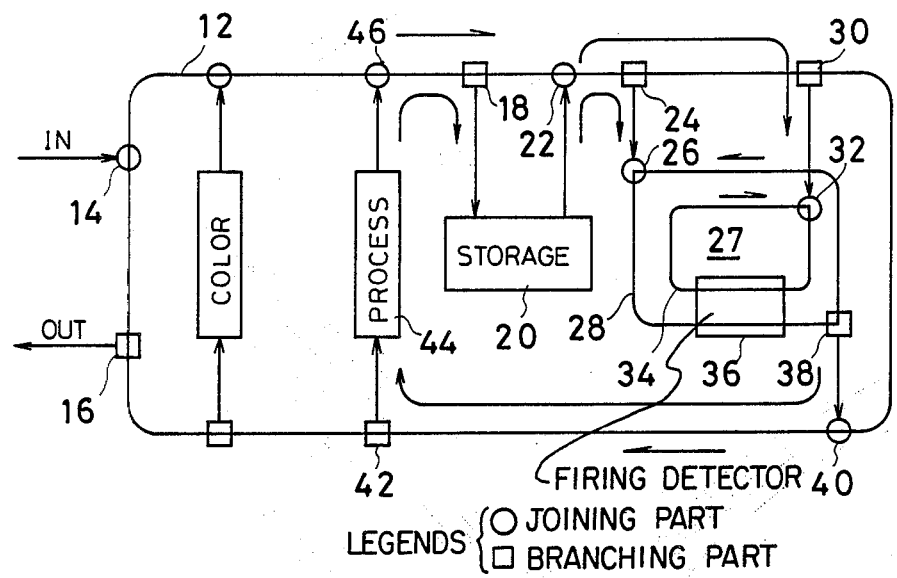
FIG. 1 is a system concept view showing one example of a data processing apparatus capable of embodying the present invention.

FIG. 1 is a system concept view showing one example of a parallel-processing type data processing apparatus capable of embodying the present invention. A system 10 comprises an asynchronous delay line ring 12 as a data transmission path, and a data packet to be processed through a joining part 14 is given to this asynchronous delay line ring 12, and the processed data is outputted through a branching part 16. The data packet given from the joining part 14 is branched by the branching part 18 through the asynchronous delay line ring 12, being given to a function storage 20. The data read from the function storage 20 is given again to the asynchronous delay line ring 12 through a joining part 22.

The data packet given from the function storage 20, for example, as shown in FIG. 3, comprises a header HD and the following plural number of data words $DW_1$-$DW_n$. The header HD comprises an operation code and a control code, and this operation code comprises a code showing the packet construction and a code showing the content or king of processing. For the code showing the packet construction, for example, the order code showing identification of the header, the last data word or the like is given, for example, by two bits, the 18th and 17th bits. The code showing the content of processing is particularly called the F code, being used for specifying the kind of processing, for example, "+", "−", or replacement or insertion of data or the like. The control code comprises the node information ascribed to the program construction, that is, the logical information such as a physical address information and color.

The data packet as described above which is transmitted by the asynchronous delay line ring 12 is given to a first loop-shaped data transmission path 28 constituting a firing part 27 through the branching part 24 and the joining part 26. A different data packet is taken into a second loop-shaped data transmission path 34 constituting the firing part 27 through a different branching part 30 and a different joining part 32. The data packets given to the first and the second loop-shaped data transmission paths 28 and 34 are transmitted through the respective loops in the directions reverse to each other, being given to a firing detecting part 36 constituting the firing part 27 together with these transmitting paths.

In the firing detecting part 36, the control codes comprised respectively in two data packet are compared with each other, and thereby decision is made on whether or not the data packet existing on the first-loop shaped data transmission path 28 and the data packet existing on the second loop-shaped data transmission path 34 make a pair, and one new data packet is produced based on specific data packets detected as a pair of data packets. The new data packet thus produced is placed, for example, on the first loop-shaped data transmission path 28, being brought again onto the asynchronous delay line 12 through a branching part 38 and a joining part 40.

The new data packet transferred on the asynchronous delay line ring 12 is given to an operation processing part 44 through a branching part 42, and here single or plural operand data which is comprised in the data packet and follows the header is processed according to the operation code comprised in the header of the data packet. The data processed by this operation processing part 44 is joined again to the asynchronous delay line ring 12 through a joining part 46. The result of this processing is given again to the function storage part 20 or outputted through the branching part 16.

The present invention is suitable for the firing part 27 of the system 10 as shown in FIG. 1. However, it is pointed out in advance that the present invention is generally applicable to all data processing apparatuses which are required to find the counterpart data or data packet to be paired and produce one new data or data packet from the paired data or data packets.

Figure 2:
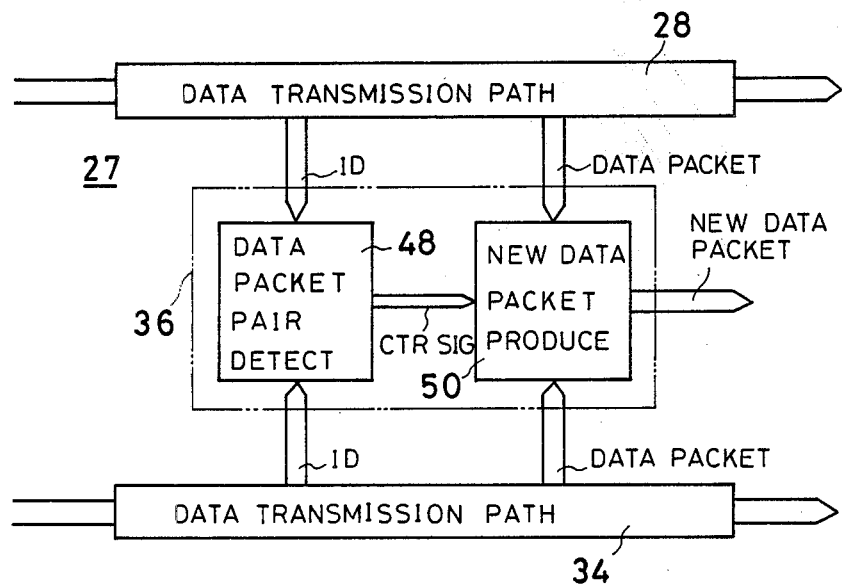
FIG. 2 is a schematic diagram showing a basic embodiment in accordance with the present invention.

FIG. 2 is a schematic block diagram showing a basic-embodiment in accordance with the present invention. The first and the second loop-shaped data transmission paths 28 and 34 are shift register, being preferably constituted with self-running type shift register. The self-running type shift register, as described in detail later, has plurality of latch registers connected in a cascade fashion and can perform independently and simultaneously push-in and pop-up of data and further therein the pushed-in data is shifted automatically in the direction of output provided that the latch register of a pre-stage is in the vacant state and accordingly, in this embodiment and all embodiments as described later, these first and second data transmission paths 28 and 34 are constituted as asynchronous type data transmission paths.

Meanwhile, in the system in FIG. 1, the two data transmission paths 28 and 34 are described as ones constituting a loop. However, these have to not always have a loop-shaped configuration. However, as described in detail later, it is desirable that at least one of them and preferably both of them are constituted in a loop fashion.

Figure 3A:
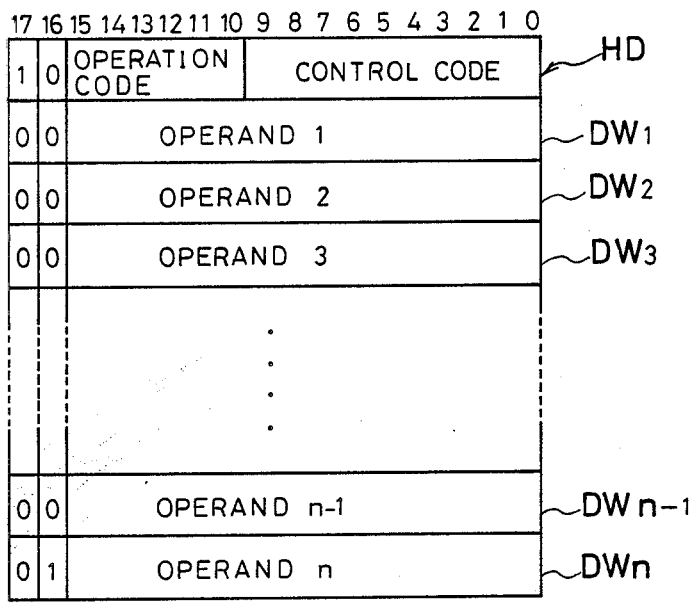
FIG. 3A and FIG. 3B are illustrative views showing different examples of a data packet, respectively.
Figure 3B:
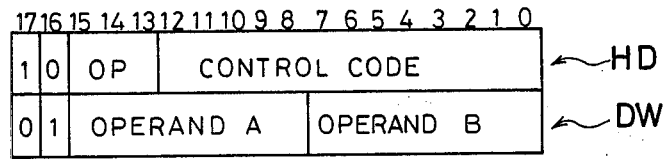

On such first and second data transmission paths 28 and 34, the data packets having a configuration as shown in FIG. 3A or FIG. 3B are transmitted in the same direction or in the directions reverse to each other. In the data packet as shown in FIG. 3A, one data word comprises one operand data and in the data packet as shown in FIG. 3B, one data word comprises a plurality of (two in this example) operand data.

The first detecting part 36 is connected to the first and the second data transmission paths 28 and 34 and this firing detecting part 36 comprises a data packet pair detecting circuit 48 and a new data packet producing circuit 50. The data packet pair detecting circuit 48 extracts the identification data comprised in the control code (FIG. 3A or FIG. 3B) from the data packets transmitted on the first and the second data transmission paths 28 and 34 and compares the two extracted identification data, thereby detecting the counterpart data packet to be paired. When a pair of data packets is detected, a signal is given to the new data packet producing circuit 50 from this data packet pair detecting circuit 48. Responsively, the new data packet producing circuit 50 takes-in the data packet comprising the detected identification data. Then, the circuit 50 produces one new data packet from the two taken-in data packets and outputs it.

Figure 4A:
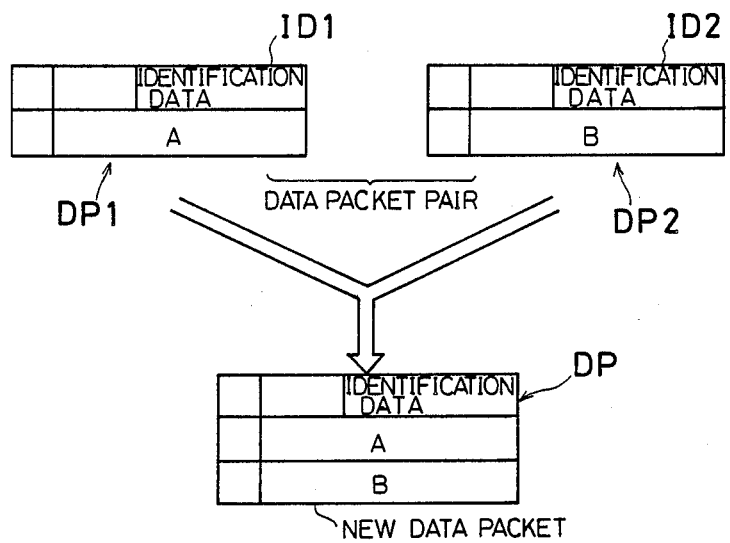
FIG. 4A and FIG. 4B are concept views explaining that one new data packet is produced from the data packets to be paired, respectively.

To be further detailed, as shown in FIG. 4A, it is assumed that data packets DP1 and DP2 constituted as shown in FIG. 3A are transmitted on the first and the second data transmission paths 28 and 34. Data comprising identification data ID1 and ID2 are given to the data packet pair detecting circuit 48 from these data transmission paths 28 and 34. Then, this two identification data ID1 and ID2 are extracted to be compared. If these two identification data ID2 and ID2 have a certain relationship, for example, if node information in the program construction or the like coincide, this is directed by a comparing circuit (not illustrated). Thus, in the data packet pair detecting circuit 48, the data packets DP1 and DP2 are identified as ones to be paired with each other. The new data producing circuit 50 reads the data packets DP1 and DP2 thus identified from the first and the second data transmission paths 28 and 34 respectively and produces one new data packet DP. This new data packet has a data packet construction as shown in FIG. 3A.

Figure 4B:
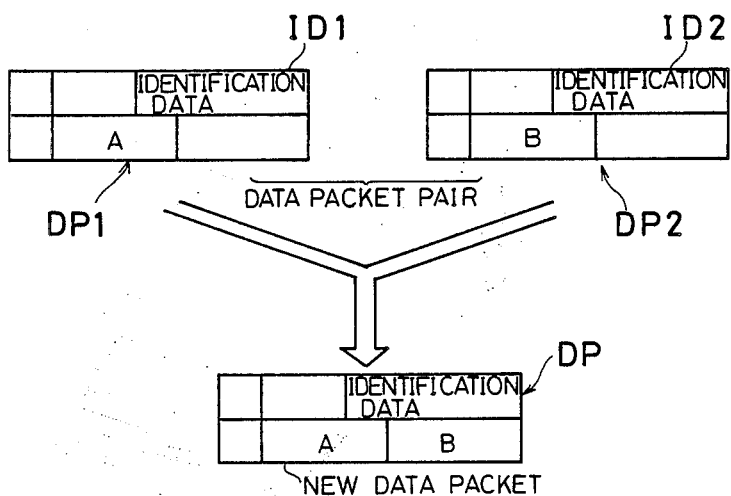

Also, it is assumed that, as shown in FIG. 4B, the data packets DP1 and DP2 having a construction as shown in FIG. 3B are transmitted on the first and the second data transmission paths 28 and 34, respectively. Likewise the case of FIG. 4A, the identification data ID1 and ID2 comprised in the data packets DP1 and DP2 are compared with each other and if a certain relation between then is detected, the new data packet producing circuit 50 produces one new data packet DP as shown in FIG. 4B. In this example as shown in FIG. 4B, the new data packet DP has a construction as shown in FIG. 3B.

Figure 5:
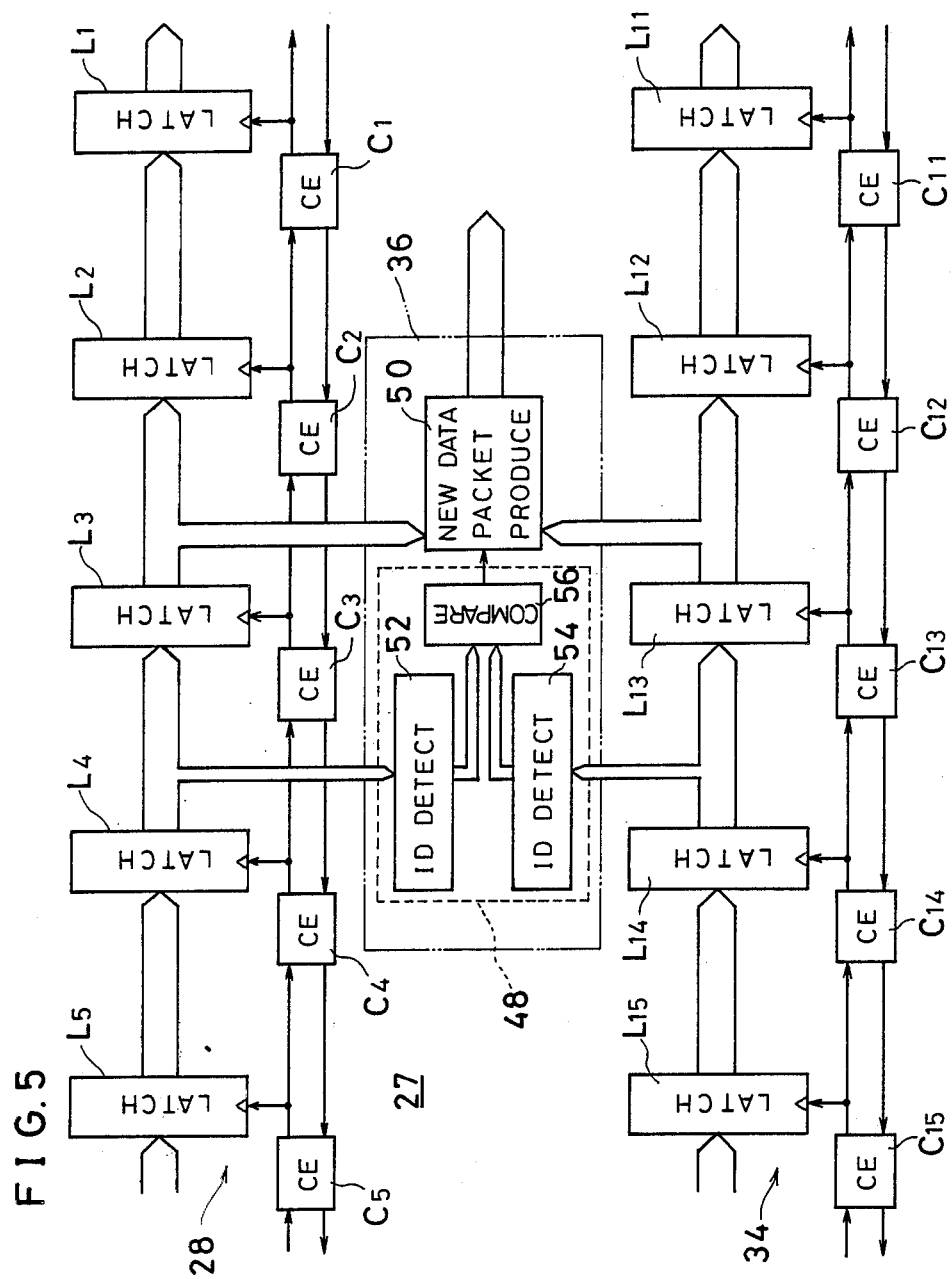
FIG. 5 is a block diagram showing one embodiment in accordance with the present invention.

FIG. 5 is a block diagram showing one embodiment in accordance with the present invention. In this embodiment shown, both of a first and second data transmission paths 28 and 34 are constituted as a self-running type shift register. The self-running type shift register constituting the first data transmission path 28 comprises latch registers $L_1$-$L_5$, which are connected in a multi-stage cascade fashion and C elements (Coincidence elements) $C_1$-$C_5$, which are installed in association with the respective latch registers. Likewise, a self-running type shift register constituting the second data transmission path 34 comprises latch registers $L_{11}$-$L_{15}$ connected in a cascade fashion and C elements $C_{11}$-$C_{15}$ corresponding to each thereof.

Figure 6:
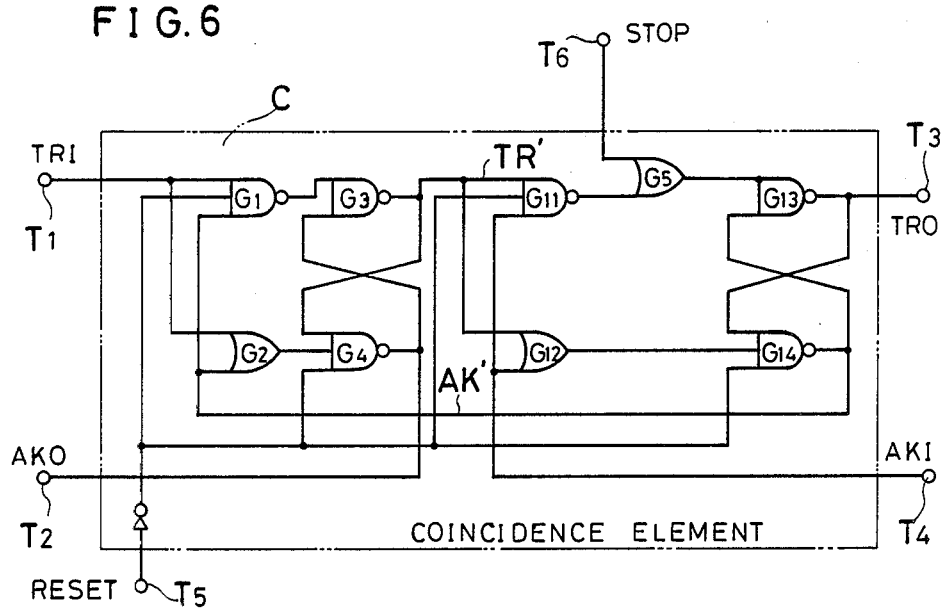
FIG. 6 is a circuit diagram showing one example of a coincidence element used for FIG. 5 embodiment.
Figure 7:
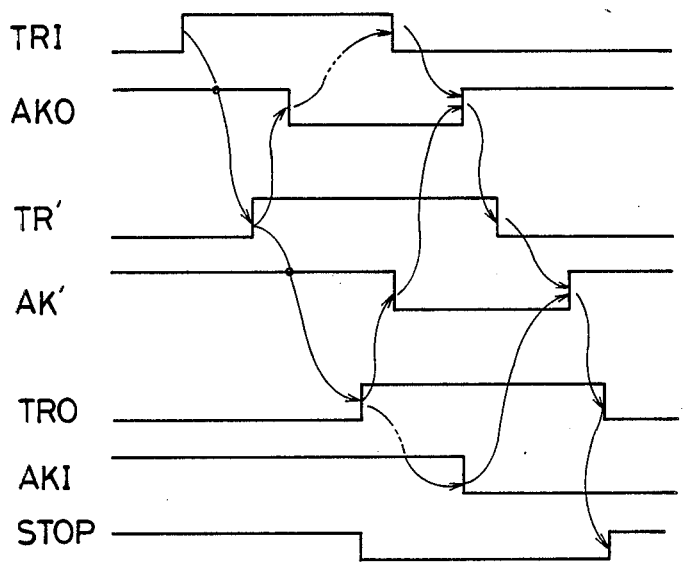
FIG. 7 is a timing chart for explaining a circuit in FIG. 6.

Here, description is made on the C element constituting the asynchronous self-running type shift register in reference to FIG. 6 and FIG. 7. The C element C comprises six terminals $T_1$-$T_6$, and a signal TRI (Transfer In) from the post-stage C element is given to the terminal $T_1$, and signal AKO (Acknowledge Out) is outputted to the post-stage C element from the terminal $T_2$. A signal TRO (Transfer Out) is outputted to the pre-stage C element from the terminal $T_3$, and a signal AKI (Acknowledge In) from the pre-stage C element is given to the terminal $T_4$. The signal TRO is further given to the corresponding latch register as a transfer command signal. Then, the signal AKI is given as a vacancy signal of the pre-stage latch resister.

Meanwhile, a reset signal RESET is given to the terminal $T_5$, and a stop signal STOP is given to the terminal $T_6$.

In a circuit in FIG. 6, when the reset signal RESET is given from the terminal $T_5$, this signal is inversed by an inverter, and outputs of four NAND gates $G_1$, $G_4$, $G_{11}$ and $G_{14}$ become the high level, and accordingly outputs of NAND gates $G_3$ and $G_{13}$ receiving them go to the low level. The high-level output of the NAND gate $G_4$ becomes the signal AKO, being given from the terminal $T_1$ as the signal AKI to the post-stage C element. This is a signal representing the vacant state of the pre-stage latch register. At this time, if no data arrives yet, the signal TRI to the terminal $T_1$ if of the low level. When the reset signal RESET to the terminal $T_5$ is released, the output of the inverter goes to the high level, while a signal AK' from the NAND gate $G_{14}$ is also of the high level, and this state is the initial state.

In the initial state, accordingly, respective outputs of the NAND gates $G_1$ and $G_{11}$ are of high level, and one of inputs of OR gates $G_2$ and $G_{12}$ is of the high level. Consequently, two inputs of the NAND gates $G_3$ and $G_{13}$ are of high level respectively, and accordingly outputs of these NAND gates $G_3$ and $G_{13}$ are of the low level respectively. This means that a signal TR' and the signal TRO from the terminal $T_3$ are of the high level. Inputs of the NAND gates $G_4$ and $G_{14}$ go to the low level, the high level and high level respectively, and outputs of these NAND gates become the high level respectively.

When data is transferred and the signal TRI to the terminal $T_1$ given from the post-stage C element is turned to the high level as shown in FIG. 7, all of three inputs of the NAND gate $G_1$ go to the high level, and the output thereof becomes the low level. Then, the output of the NAND gates $G_3$, that is, the signal TR' goes to the high level as shown in FIG. 7, and the output of the NAND gate $G_4$ goes to the low level. When the signal TR' becomes the high level, the output of the NAND gate $G_{11}$ goes to the low level, the output TRO of the NAND gate $G_{13}$ goes to the high level and the output AK' of the NAND gate $G_{14}$ goes to the low level. The outputs of the NAND gates $G_4$ and $G_{14}$ return to the inputs of the NAND gates $G_3$ and $G_{13}$ respectively, and the outputs of these NAND gates $G_3$ and $G_{13}$ are locked in the high-level state. Thus, as shown in FIG. 5, the signal AKO from the terminal $T_2$ goes to the low level and it is delivered to the post-stage C element that the data has been transferred to the latch register corresponding to this C element, that is, transfer of the data is not accepted in this state. Also, the output of the NAND gate $G_{13}$ is of the high level, and the high-level signal TRO is given to the pre-stage C element from the terminal $T_3$. This high-level signal TRO is given as a command of transferring to the latch register corresponding thereto, and the data of this latch register is sent to the pre-stage.

When the signal AKO becomes the low level, the signal TRI goes to the low level as shown in FIG. 7, and accordingly the output TR' of the NAND gate $G_1$ returns to the high level. Furthermore, as described above, the output AK' of the NAND gate $G_{14}$ is changed to the low level, and thereby the output AKO of the NAND gate $G_4$ returns to the high level, and the output TR' of the NAND gate $G_3$ returns to the low level. When the signal AKO from the pre-stage C element, that is, the signal AKI given from the terminal $T_4$ is changed to the low level from the high level as shown in FIG. 7, that is, when a vacancy of the pre-stage latch register is detected, the input of the OR gate $G_{12}$ goes to the low level, and the signal TR' is also of the low level, and therefore the output of this OR gate $G_{12}$ also goes to the low level. At this time, the output of the NAND gate $G_{13}$ is of the high level, and therefore the output of the NAND gate $G_{14}$ is changed to the high level. Consequently, the input of the NAND gate $G_{13}$ goes to the high level, and the output of the NAND gate $G_{13}$ returns to the low level. Thus, the same state as the initial state is restored. If the signal AKO from the pre-stage C element, that is, the signal AKI from the terminal $T_4$ is kept intact at the low level, that is, if the latch register corresponding to the pre-stage C element is not yet in the vacant state, one input of the NAND gate $G_{11}$ is kept intact at the low level, and therefore the signal TRI from the terminal $T_1$ is given as high-level signal, and the NAND gate $G_{11}$ does not act even when the signal TR' is changed to the high level, and then signal TRO does not go to the high level, and thereby acceptance of data from the post-stage is rejected, and accordingly no data can be transferred to the latch register corresponding to this C element in this state.

Thus, as shown in FIG. 5, the asynchronous self-running type shift registers of the first and second data transmission path 28 and 34 are constituted with the latch registers $L_1$-$L_5$ and the C elements $C_1$-$C_5$, and also the latch registers $L_{11}$-$L_{15}$, and Celements $C_{11}$-$C_{15}$, respectively Meanwhile, when the stop signal STOP is given to this C element from the terminal $T_6$ in the initial state, this high-level signal makes the output of the OR gate $G_5$ to fix the high level, and the data transfer is stopped.

Reverting to FIG. 5, data lines extend from respective data transmission paths from the latch registers $L_4$ and $L_{14}$ to the latch registers $L_3$ and $L_{13}$ which constitute the first and the second data transmission paths 28 and 34 and from these data lines, respective data are given to identification data detecting circuits 52 and 54 comprised in the data packet pair detecting circuit 48. These identification data detecting circuit 52 and 54 extract the identification data from the header (FIG. 3A or FIG. 3B) of the data packet, giving it to a comparing circuit 56. The comparing circuit 56 compares the two given identification data and determines on coincidence, non-coincidence or the like of the both. When a coincidence of the two identification data is detected in the comparing circuit 56, thereby the data packets to be paired is determined and a control signal informing this determination is given to the new data packet producing circuit 50.

A data packet lines extend from the transmission paths from the latch registers $L_3$ and $L_{13}$ to the latch registers $L_2$ and $L_{12}$ which constitute the first and the second data transmission paths 28 and 34 to the new data packet producing circuit 50 takes-in the determined specific data packets to be paired through that data packet lines based on a coincidence signal or a control signal from the comparing circuit 56. Then, the new data packet producing circuit 50 combines these two data packets to produced one new data packet. The new data packet DP (FIG. 4A or FIG. 4B) thus produced in the data packet producing circuit 50 is sent to the other processing circuit for the following processing through a new data packet lines, for example, through the main data transmission path 12 (FIG.1).

In the embodiment shown in FIG. 5, the identification data detecting circuits 52 and 54 detect the identification data within a relatively short time during which the data packets are sent from the latch registers $L_4$ and $L_{14}$ to the latch registers $L_3$ and $L_{13}$, respectively, and the comparing circuit 56 has to compare them with that time. Accordingly, there is a possibility of causing a detection error depending on the data transmitting speed on the data transmission paths 28 and 34.

Then, it is considered to adopt a configuration of holding the identification data of that data packets for a certain time in the identification data detecting circuits 52 and 54.

Figure 8:
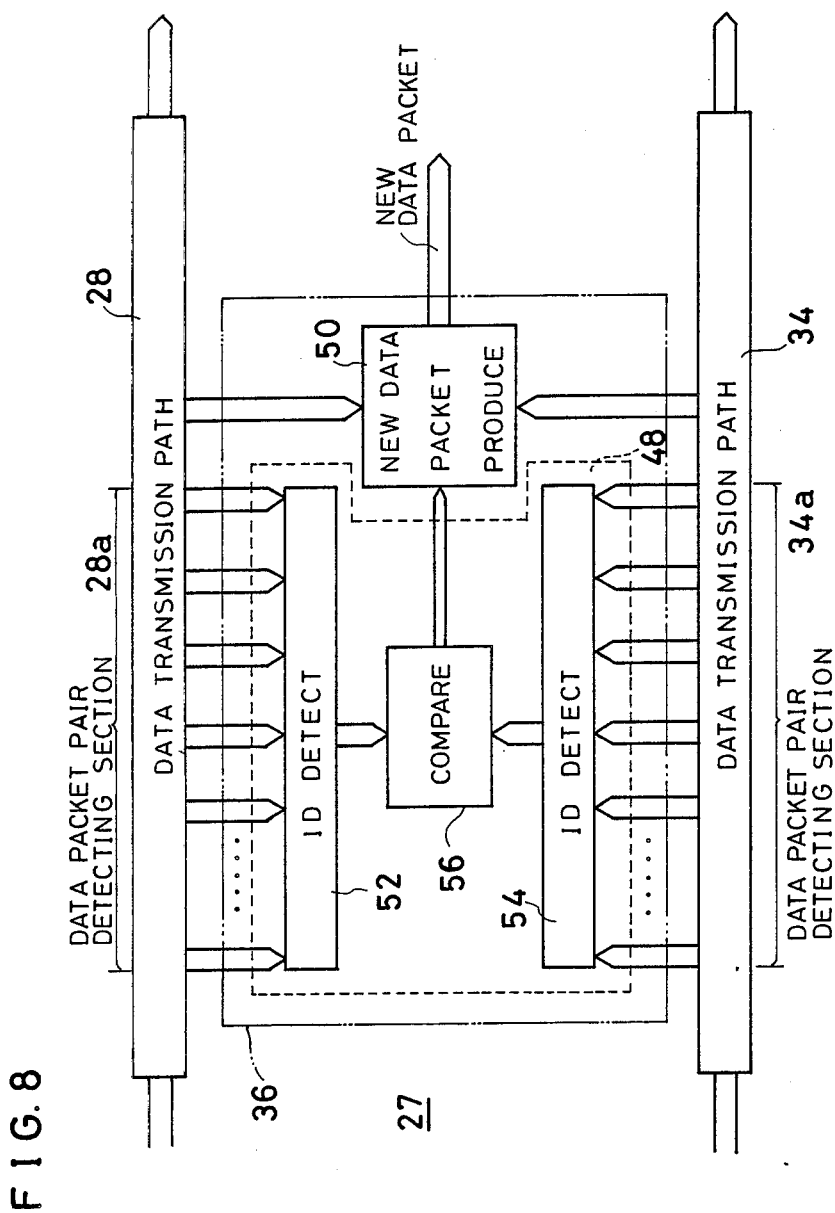
FIG. 8 is a block diagram showing another embodiment in accordance with the present invention.

FIG. 8 is a schematic block diagram showing another embodiment in accordance with the present invention. The firing part 27 of this embodiment, likewise the embodiment in FIG. 5, comprises the firing detecting part 36 connected to the first and the second data transmission paths 28 and 34. This firing detecting part 36 comprises the data packet pair detecting circuit 48 and the new data packet producing circuit 50. The data packet pair detecting circuit 48 comprises the identification data detecting circuit 52 for detecting the identification data from the data packet transmitted on the first data transmission path 28 and the identification data detecting circuit 54 for detecting the identification data from the data packet transmitted on the second data transmission path 34. The two identification data thus detected are compared by the comparing circuit 56. The comparing circuit 56 gives a control signal to the new data packet producing circuit 50 when the both coincide or have a certain relationship therebetween.

In this embodiment, data packet pair detecting sections 28a and 34a of a certain length (a certain number of latch register stages) are defined on the first and the second data transmission paths 28 and 34 and an identification data is taken out from these data packet pair detecting sections 28a and 34a, respectively, for a relatively long time to further facilitate the comparison in the comparing circuit 56.

Figure 9:
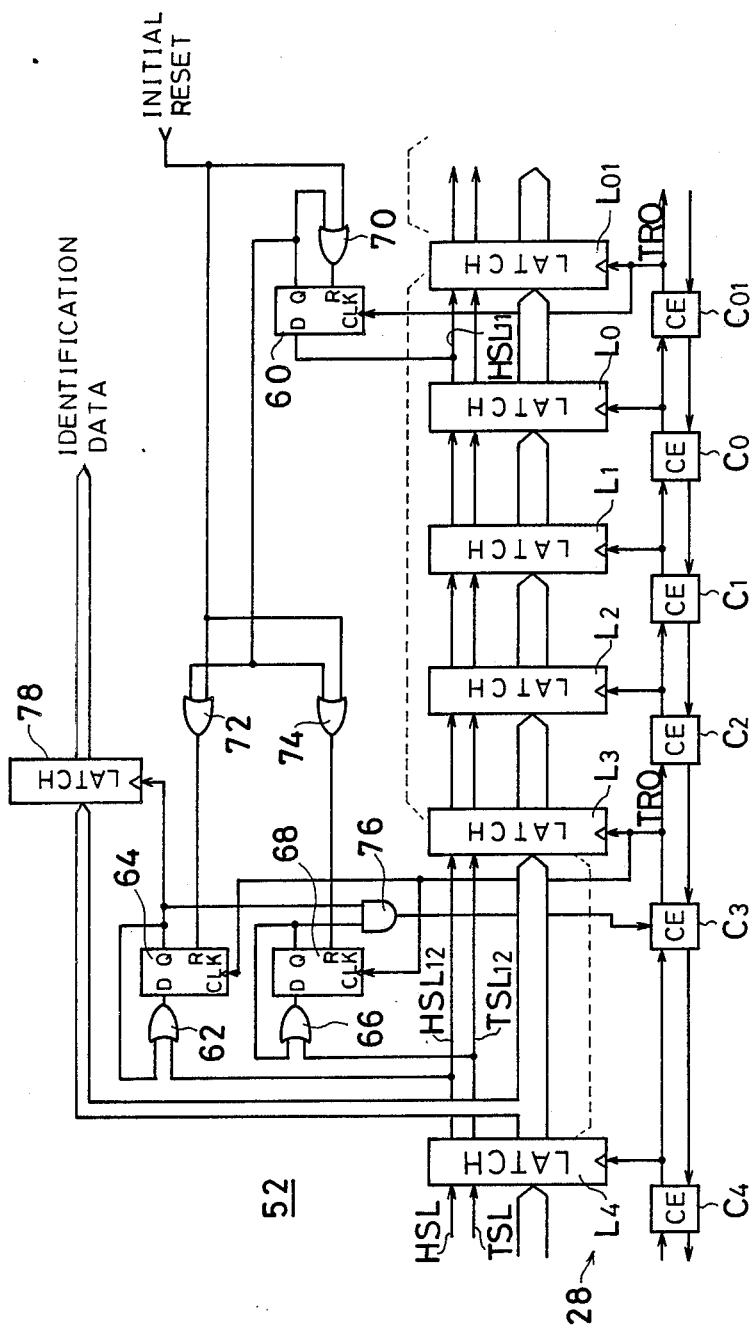
FIG. 9 is a block diagram showing one example of an identification data detecting circuit applicable to FIG. 8 embodiment.

FIG. 9 is a block diagram showing one example of an identification data detecting circuit applicable to FIG. 8 embodiment. This FIG. 9 illustrates and explains only the first identification data detecting circuit 52 which detects the identification data from the first data transmission path 28 and it should be noticed that the identification data detecting circuit 54 detecting the identification data from the second data transmission path 34 has the same configuration.

The self-running type shift register constituting the first data transmission path 28 comprises latch registers $L_{01}$, $L_0$–$L_4$ which are connected in a cascade fashion and associated C elements $C_{01}$, $C_0$–$C_4$. A header signal line HSL is connected to the 18-th bit of each of the latch registers $L_{01}$, $L_0$–$L_4$ and a tail signal line TSL is connected to the 17-th bit of each of then, respectively. A header signal line $HSL_{11}$ between the latch registers $L_{01}$ and $L_0$ is given to a D input of a D flip-flop 60 and a header signal line $HSL_{12}$ between the latch registers $L_3$ and $L_4$ is given to a D input of a D flip-flop 64 through an OR gate 62. A tail signal line $TSL_{12}$ between the latch registers $L_3$ and $L_4$ is given to a D input of a D flip-flop 68 through an OR gate 66.

The signal TRO from the C element $C_{01}$ is given to a clock input of the previous D flip-flop 60. To the reset input of this D flip-flop 60, the initial reset signal is given through an OR gate 70, and also the output Q of itself is given to one of inputs of the OR gate 70. Furthermore, the output Q of the D flip-flop 60 is given to respective reset inputs of the D flip-flops 64 and 68 through OR gates 72 and 74 along with the initial reset signal. The output Q of the D flip-flop 64 is given to one of inputs of the above-described OR gate 62 whose output is given to the D input of the D flip-flop 64, also being given to one of inputs of an AND gate 76. The output Q of the D flip-flop 68 is given to the other input of this AND gate 76 and this output Q is further given to one of inputs of the OR gate 66 whose output is given to the D input of the flip-flop 68.

A header signal line is taken out from the transmission path from the latch register $L_4$ to the latch register $L_3$ and this header signal line is given to a register 78. The output Q of the previous D flip-flop 64 is given to the clock input of this register 78. Then, the output of this register 78 is given to the comparing circuit 56 (FIG. 5) as the detected identification data.

In the initial state, an initial reset signal of the high level is given. This initial reset signal is given as respective reset inputs of the D flip-flops 60, 64, and 68 through the OR gates 70, 72 and 74 and responsively, these D flip-flops 60, 64 and 68 are reset and respective data Q go to the low level. This state is the initial state.

When a vacancy of the latch register $L_3$ is detected by the associated C element $C_3$, the data packet starts to be transferred from the latch register $L_4$ to this latch register $L_3$. When the data packet, that is, the header thereof is transferred from the latch register $L_4$ to the latch register $L_3$, header signal line $HSL_{12}$ between them goes to the high level. Attending on start of transfer of such a data packet, the signal TRO from the C element C3 goes to the high level from the low level. Then, this high-level signal is given to respective inputs of the D flip-flops 64 and 68 and the high level of the header signal line $HSL_{12}$ given to the D input of the D flip-flop 64 is written to this D flip-flop 64, and the output Q of the D flip-flop 64 is turned to the high level from the low level. The high-level output from this D flip-flop 64 is given as an enable signal of the register 78 and responsively, the identification data comprised in the header outputted from the latch register $L_4$ is latched in the register 78. Then, this header is transmitted also to the latch register $L_3$.

Thereafter, the D input of the D flip-flop 64 are fixed to the high level by the OR gate 62 and the output Q there is held at the high level until the next reset signal R comes.

Thereafter, data transfer between the latch registers progresses and the last data word DW (FIG. 3A or FIG. 3B) of the data packet starts to be transferred from the latch register $L_4$ to the latch register $L_3$. At this time, the tail signal line TSL is turned to the high level and in due time the C element C3 outputs the high-level signal TRO. This high-level signal is given to the clock inputs of the D flip-flops 64 and 68 and at this time, the high level of the tail signal line TSL is given to the D input of the D flip-flop 68 through the OR gate 66. Accordingly, the output Q of the D flip-flop 68 goes to the high level at the timing when the signal TRO of the C element C3 goes to the high level and the last data word is given to the latch register $L_3$. Also, to the D input of the D flip-flop 68 the high level of the output Q of itself is given, and therefore this D flip-flop 68 is held at the high level until the next reset signal is given.

At the moment the outputs Q of the D flip-flops 64 and 68 both go to the high level, the output of the AND gate 76 goes to the high level and the stop signal STOP (FIG. 7) is given to the C element C3. Accordingly, the next data packet cannot be transferred from the latch register $L_4$ to the latch register $L_3$ until this stop signal, that is, the output of the AND gate 76 returns to the low level next.

Thereafter, the preceding header is transferred to the latch register $L_0$ and then the header signal line $HSL_{11}$ associated therewith goes to the high level. Then, the signal TRO of the C element $C_{01}$ goes to the high level and then the output Q of the D flip-flop 60 is turned to the high level from the low level and the header is further transferred to the pre-stage latch register $L_{01}$.

When the output of the D flip-flop 60 goes to the high level, the high-level reset signal is given to the D flip-flop 64 through the OR gates 72 and 74 and accordingly, the output Q thereof goes to the low level and the output of the AND gate 76, that is, the stop signal to the C element C3 also goes to the low level. Accordingly, at this point, transfer of the new data packet to the latch register $L_3$ is allowed and the D flip-flop 60 itself is also reset at the next moment through the OR gate 70 and this circuit 48 is returned to the initial state.

The identification data previously latched in the register 78 is held until the header of the next data packet is outputted from the latch register $L_4$ to the latch register $L_3$, that is, until the header signal line $HSL_{12}$ goes again to the high level. Accordingly, in this FIG. 9 embodiment, the identification data given to the comparing circuit 56 (FIG. 8) is held until the data transfer through four stages of latch registers is completed and thereby comparison between identification data in the comparing circuit 56 can be facilitated.

Figure 10:
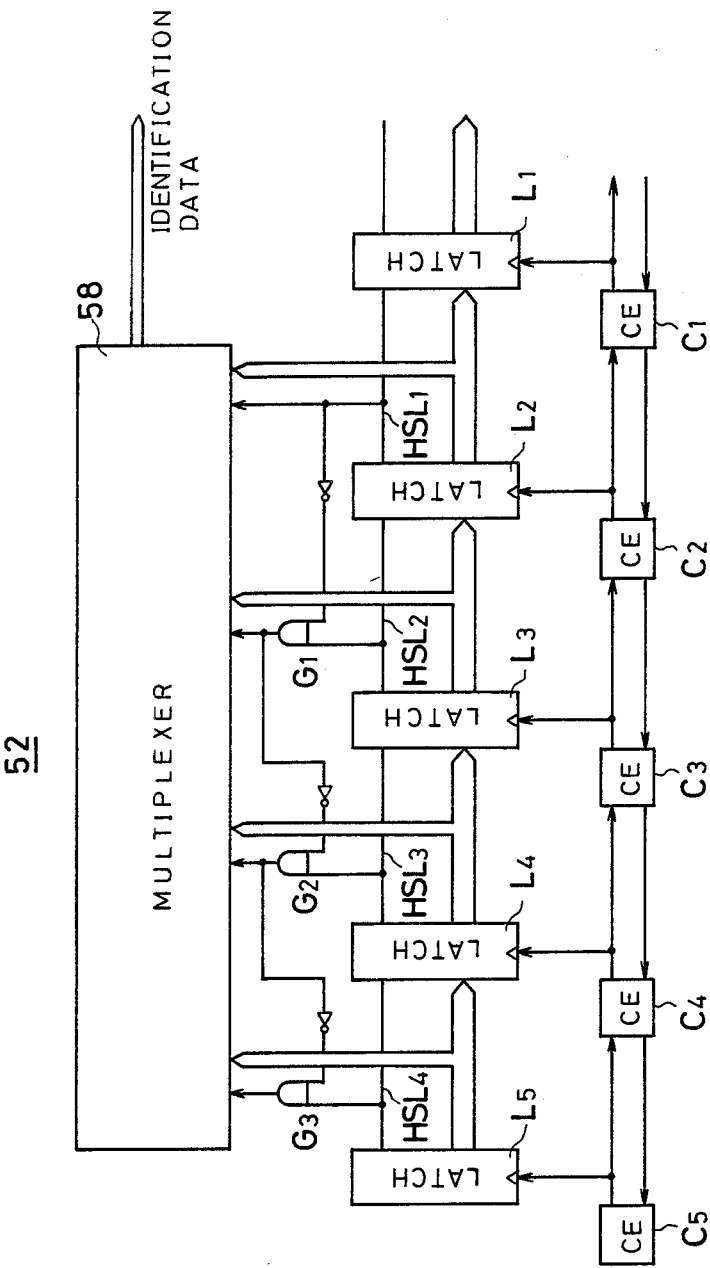
FIG. 10 is a block diagram showing another example of an identification data detecting circuit applicable to FIG. 8 embodiment.

FIG. 10 is a block diagram showing another example of an identification data detecting circuit applicable to FIG. 8 embodiment. This FIG. 10, likewise FIG. 9, also illustrates and explains only the first identification data detecting circuit 52 which takes out the identification data from the first data transmission path 28.

In FIG. 10, the identification data detecting circuit 52 comprises a multiplexer 58 which receives data from latch registers $L_2$, $L_3$, $L_4$ and $L_5$ comprised in the first data transmission path 28. This means that output of four latch registers are inputted to the multiplexer in transferring the data packet from the post-stage latch register to the prestage latch register.

A header signal line HSL is connected to the 18th bit, that is, one bit of the order code of each of the latch registers $L_1$–$L_5$. A header signal line $HSL_1$ between the latch registers $L_1$ and $L_2$ is given to the multiplexer 58 and is also inverted by an inverter to be given to one of inputs of an AND gate $G_1$. A header signal line $HSL_2$ connected between the latch registers $L_2$ and $L_3$ is given to the other input of the AND gate $G_1$. The output of the AND gate $G_1$ is given to the multiplexer 58 and is also inverted by an inverter, being given to one of inputs of an AND gate $G_2$. A header signal line $HSL_3$ connected between the latch registers $L_3$ and $L_4$ is given to the other input of the AND gate $G_2$. The output of the AND $G_2$ is given to the multiplexer 58 and is also inverted by an inverter, being given to one of inputs of a two-input AND gate $G_3$. The output of a header signal line $HSL_4$ connected between the latch registers $L_4$ and $L_5$ is given to the other input of this AND gate $G_3$ and the output thereof is given to the multiplexer 58.

The outputs of these header signal line $HSL_1$ and AND gates $G_1$–$G_3$ are given as enable signal for the corresponding inputs of the multiplexer 58.

The identification data extracted from the first data transmission path 28 is given to the comparing circuit 56 (FIG. 8) from the multiplexer 58 through an identification data line.

In the initial state, all of the header signal lines $HSL_1$–$HSL_4$ are of the low level. When the header of the data packet is transferred to the latch register $L_5$ from the post-stage latch register, the header signal line $HSL_4$ goes to the high level. On the other hand, the header signal line $HSL_3$ between the latch registers $L_4$ and $L_3$ is still of the low level and accordingly, the output of the AND gate $G_2$ is of the low level. This low level is inverted and is given to the AND gate $G_3$ and consequently, at this point, the high level is outputted from this AND gate $G_3$.

When the output of AND gate $G_3$ goes to the high level, the corresponding input of the multiplexer 58 is enabled and the identification data from the identification line between the latch register $L_5$ and $L_4$ is outputted from the multiplexer 58.

Thereafter, when a vacancy of the latch register $L_4$ is detected by the C element $C_5$, the header of the data packet is transferred to this latch register $L_4$ from the latch register $L_5$. Responsively, the header signal line $HSL_3$ goes to the high level, the output of the AND gate $G_2$ goes to the high level likewise and the AND gate $G_3$. This high-level output of the AND gate $G_2$ is inverted and is given to the AND gate $G_3$ and consequently the output of the AND gate $G_3$ is turned to the low level. On the other hand, the AND gate $G_2$ works as an enable signal of the corresponding input of the multiplexer 58, and the identification data comprised in the header transferred from the latch register $L_4$ to the latch register $L_3$ is outputted from the multipexer 58.

When the header of the data packet is transferred to the latch register $L_2$ from the latch register $L_3$ by repeating such an operation, the header signal line $HSL_1$ goes to the high level. Consequently, the output of the AND gate $G_1$ goes the low level likewise and the AND gates $G_2$ and $G_3$. When the header signal $HSL_1$ goes to the high level, the corresponding input of the multiplexer 58 is enabled, and the identification data comprised in the data packet from the latch register $L_2$ is outputted from the multiplexer 58. This means that the same identification data is continuously outputted from the multiplexer 58 during transferring with the data packets placed in four latch registers. Thus, the identification data can be held for a certain time by using the multiplexer 58. Thus, in this embodiment, in the case where any one of the header signal lines $HSL_1$–$HSL_4$ is of the high level, the identification data existing in the foremost stage is selected.

In the case where the header of the data packet is transferred from the latch register $L_2$ to the foremost stage latch register $L_1$ and the following data words other than the header are transferred to the latch register $L_2$ and then the header signal line $HSL_1$ goes to the low level again and accordingly, any one of the header signal lines $HSL_1$–$HSL_4$ goes to the high level by the header of the following data packet, the identification data existing at the foremost-stage among the header signal lines $HSL_1$–$HSL_4$ is selected by the circuit constitution as described above.

Meanwhile, in an example in FIG. 10, the number of stages of the latch registers where-from the multiplexer 58 receives data can be set arbitrarily in response to the time required.

In the previous example in FIG. 9, during the identification data detecting circuit holds the identification data in a certain data packet, data transfer of another data packet in the data packet pair detecting section of the corresponding data transmission path is stopped and therefore a waste of time takes place, while in an example in FIG. 10, data shift of the data transmission path is not stopped and therefore the efficiency is excellent.

Figure 11:
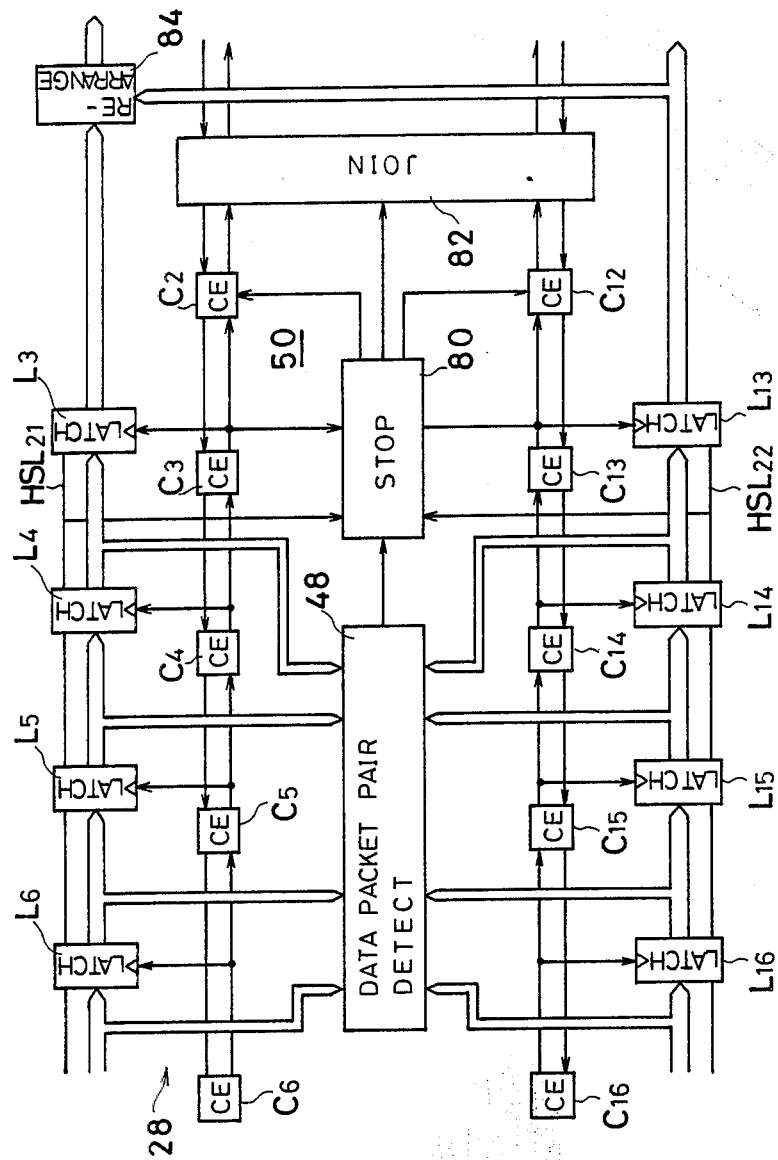
FIG. 11 is a block diagram showing still another embodiment in accordance with the present invention.

FIG. 11 is block diagram showing another embodiment in accordance with the present invention. The firing part 27 of this embodiment comprises the data packet pair detecting circuit 48 and the new data packet producing circuit 50, being characterized particularly by the new data packet producing circuit 50. The new data packet producing circuit 50 comprises a stopping circuit 80, a joining circuit 82 and a packet rearranging circuit 84. A matching signal from the comparing circuit 56 (FIG. 5) comprised in the data packet pair detecting circuit 48 is given to the stopping circuit 80. Further, the header signal from the header signal line $HSL_{21}$ between the latch registers $L_3$ and $L_4$ comprised in the self-running type shift register constituting the first data transmission path 28 and the header signal from the header signal line $HSL_{22}$ between the latch registers $L_{13}$ and $L_{14}$ of the self-running type shift register constituting the second data transmission path 34 are given to the stopping circuit 80. Furthermore, to the latch registers $L_3$ and $L_{13}$, the signals TRO from the corresponding C elements $C_2$ and $C_{12}$ are given, respectively. From the stopping circuit 80, a stop signal STOP (FIG. 7) is given to the pre-stage C elements $C_2$ and $C_{12}$ and also a joining control signal is given to the joining circuit 82. The packet rearranging circuit 84 is inserted into the first data transmission path 28 and rearranges one new data packet from a pair of data packets given from the first data transmission path 28 and the second data transmission path 34, putting this recombined new packet on the first data transmission path 28. The joining circuit 82 controls the joining of the new data packet by such a packet rearranging circuit 84 onto the first data transmission path 28.

Figure 12:
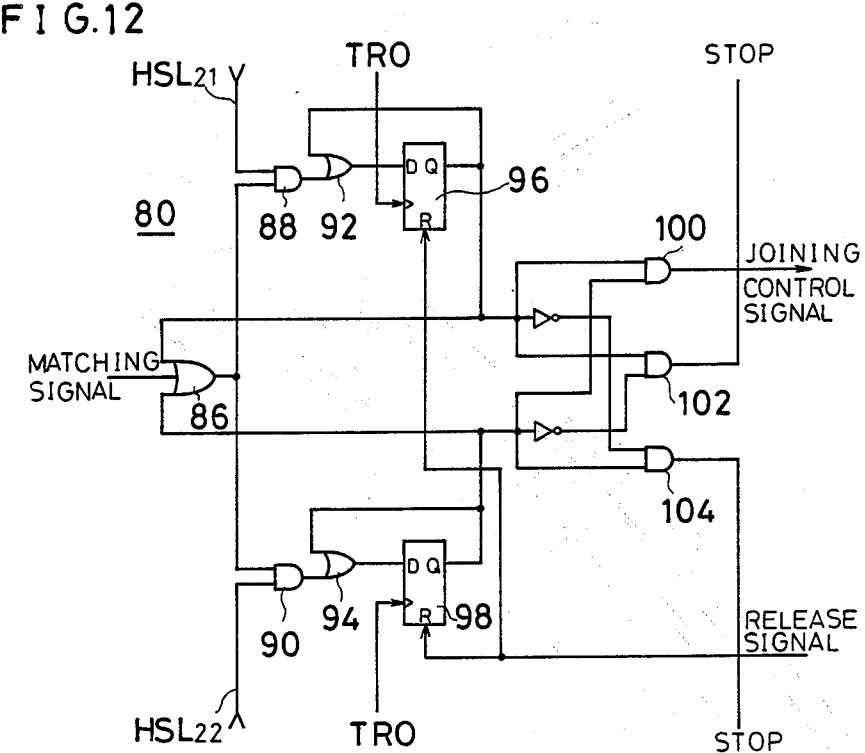
FIG. 12 is a circuit diagram showing one example of a stopping circuit of FIG. 11 embodiment.

In reference to FIG. 12, the stopping circuit 80 comprises an OR gate 86 and a matching signal from the comparing circuit 56 (FIG. 5) is given to one of inputs of this OR gate 68 and the output thereof is given to one of inputs of each of two AND gates 88 and 90. A header signal from the header signal line $HSL_{21}$ as shown in FIG. 11 is given to the other input of the AND gate 88 and a header signal from the header signal line $HSL_{22}$ is given to the other input of the AND gate 90. Outputs of these AND gates 88 and 90 are both given as D inputs of the D flip-flops 96 and 98 through AND gates 92 and 94, respectively. The signal TRO from the C element $C_3$ associated with the first data transmission path 28 is given to a clock input of this D flip-flop 96 and similarly, the signal TRO from the C element $C_{13}$ of the second transmission path 34 is given to a clock input of the D flip-flop 98. Respective outputs Q of the D flip-flops 96 and 98 are given as D inputs of themselves through the OR gates 92 and 94, also being given as the remaining input of the OR gate 86.

The output Q of the D flip-flop 96 is given intact to one of inputs of each of AND gates 100 and 102 and is inverted by an inverter, being given to one of inputs of an AND gate 104. Also, the output Q of the D flip-flop 98 is given intact to the other inputs of the AND gates 100 and 104 and is also inverted by an inverter, being given to the other input of the AND gate 102. The output of the AND gate 102 is given to the C element $C_2$ of the first data transmission path 28 as the stop signal and the output of the AND gate 104 is given to the C element $C_{12}$ of the second data transmission path 34 as the stop signal STOP. Furthermore, the output of the AND gate 100 is given to the joining circuit 82 as a joining control signal.

The signal AKI is given to the above-described C element $C_2$ comprised in the first data transmission path 28 is given to the reset inputs of the D flip-flops 96 and 98 as a stop release signal.

The joining circuit 82 receives the joining control signal from the stopping circuit 80 and the joining control signal is inverted and is given to one of inputs of each of AND gates 106, 108 and 116, also being given to one of inputs of an AND gate 114. The signal TRO from the E element $C_2$ comprised in the first data transmission path 28 is given to the other input of the AND gate 106. Also, the signal TRO from the C element $C_{12}$ comprised in the second data transmission path 34 is given to the other input of the AND gate 108. Then, the output of the AND gate 106 is given to one of inputs of an OR gate 112 and to the other input of the OR gate 112, an output of an AND gate 110 to which the signals TRO from the C element $C_2$ and the C element $C_{12}$ and the joining control signal are given. The output of the OR gate 112 is given to the C element of the preceding stage. Likewise, the output of the AND gate 108 is also given to the C element of the preceding stage comprised in the second data transmission path 34. The signal AKO from that C element comprised in the first data transmission path 28 is given to the other input of an AND gate 114 and the signal AKO from the C element of the preceding stage of the second data transmission path 34 is given to the other input of an AND gate 116. The outputs of these two AND gates 114 and 116 are both given to the C element $C_{12}$ comprised in the second data transmission path 34 through an OR gate 118.

When the header of the data packet is transferred to the latch register $L_4$ of the first data transmission path 28, the header signal line $HSL_{21}$ goes to the high level and at this time, if a high-level matching signal is obtained from the comparing circuit 56 (FIG. 5) comprised in the data packet pair detecting circuit 48, two inputs of the AND gate 88 of the stopping circuit 80 both go to the high level and D input of the D flip-flop 96 go to the high level. Then, the signal TRO from the C element $C_3$ corresponding to the latch register $L_3$ further goes to the high level, that is, if this header is transferred to the latch register $L_3$, the D flip-flop 96 is set and the output Q thereof goes to the high level. Also, if the header is transferred to the latch register $L_{14}$ comprised in the second data transmission path 34, the header signal line $HSL_{22}$ goes to the high level and at this time, if the above-described coincidence signal is obtained, the D flip-flop 98 is set in response to the signal TRO from the C element $C_{13}$. This means that if the headers of the data packets to be paired arrive at the latch register $L_3$ of the first data transmission path 28 and the latch register $L_{13}$ of the second data transmission path 34, either of the D flip-flop 96 and 98, whichever earlier is first set. Then, the D flip-flop which has not been set is set without fail if the corresponding header arrives. Thus, the D flip-flops 96 and 98 are to hold the matching signal from the comparing circuit 56 of the data packet pair detecting circuit 48.

In the state that one of the D flip-flops 96 is set and the other flip-flop 98 is not set yet, that is, in the state that the corresponding header does not arrive yet at the latch register $L_{13}$ of the second data transmission path 34, two inputs of the AND gate 102 both go to the high level and accordingly the stop signal STOP to the terminal $T_6$ (FIG. 6) of the C element $C_2$ goes to the high level. Then, this C element $C_2$ is placed in the stopped state.

In reverse, in the state that the D flip-flop 98 is set and the D flip-flop 96 is not set yet, that is, in the state that the corresponding header does not arrive yet at the first data transmission path 28, the stop signal STOP from the AND gate 104 is outputted and consequently data transmission on the second data transmission path 34 is stopped.

Thus, synchronizing of the data packets to be paired is performed by the stopping circuit 80.

Next, in the state that the two flip-flops 96 and 98 are both set, that is, in the state that the corresponding headers have both arrive at the latch registers $L_3$ and $L_{13}$, one of inputs of each of the AND gates 102 and 104 goes to the low level and the stop signal STOP goes to the low level. Then, the two inputs of the AND gate 100 both go to the high level and the high-level joining control signal is outputted to the joining circuit 82. Accordingly, one of inputs of the AND gate 114 comprised in the joining circuit 82 goes to the high level and in reverse one of inputs of the AND gate 116 goes to the low level. Accordingly, the signal AKO not from the C element of the second data transmission path 34 but from the C element comprised in the first data transmission path 28 is outputted from the OR gate 118 and this signal is given as the signal AKI of the C element $C_{12}$ of the second data transmission path 34. At the same time, one of inputs of the AND gate 108 goes to the low level, the signal TRO to the C element of the preceding stage from the C element $C_{12}$ goes to the low level. Also, since the joining control signal is of the high level, the output of the AND gate 110 is enabled as the input of the OR gate 112. Accordingly, when the both signals TRO of the C element $C_2$ of the first data transmission path 28 and the C element $C_{12}$ of the second data transmission path 34 are of the high level, the high-level signal TRO is given to the C element of the pre-stage of the first data transmission path 28. Accordingly, thereafter, the data packet on the second data transmission path 34 is given to the packet rearranging circuit 84 installed in the first data transmission path 28 and disappears from the second data transmission path 34.

Packet rearrangement is performed in the data packet rearranging circuit 84 and the new data packet is brought on the first data transmission path 28 from it and thereafter the high-level stop release signal is given to the stopping circuit 80 and the D flip-flop 96 and 98 are both reset and accordingly, the new data packet producing circuit 50 is disabled. Thus, coincidence of the data packets to be paired is detected and the one new data packet is produced.

Figure 14:
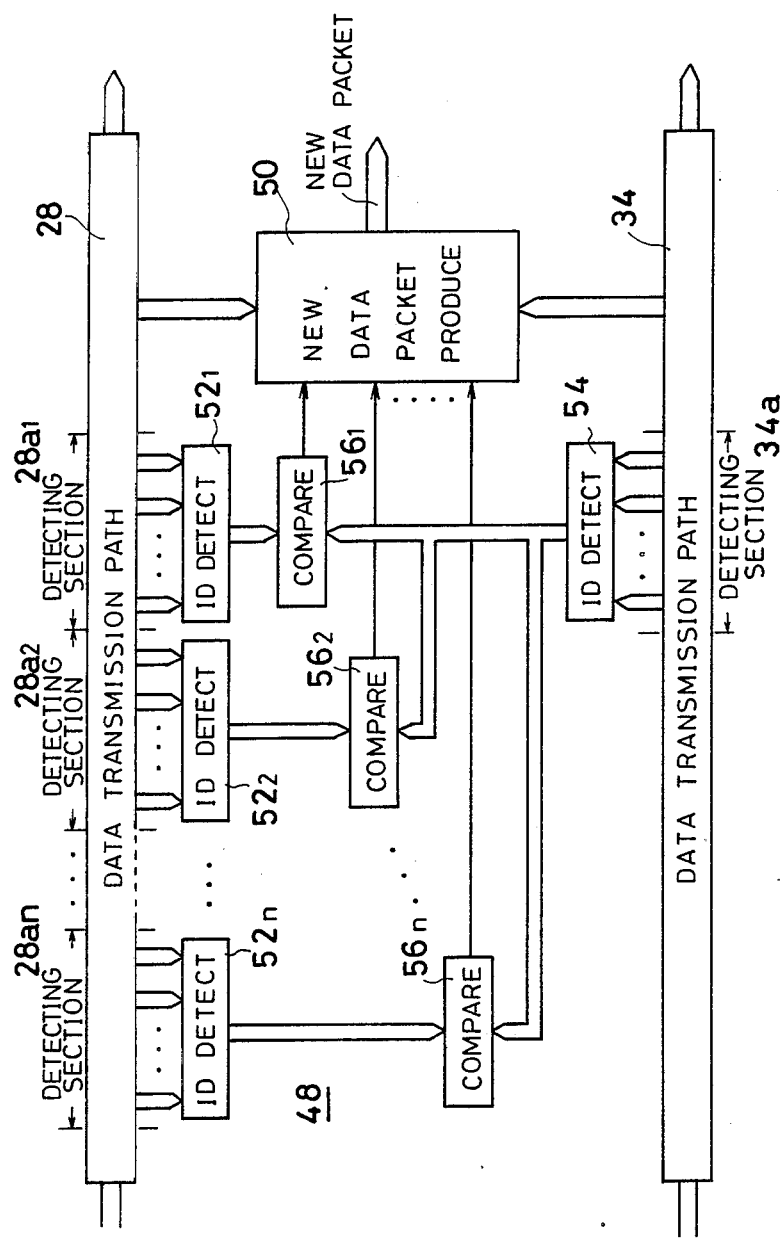
FIG. 14 is a block diagram showing a further embodiment in accordance with the present invention.

FIG. 14 is a block diagram showing another embodiment in accordance with the present invention. This FIG. 14 embodiment is effective for preventing the so-called "deadlock" that the data packets to be paired cannot be found forever.

Figure 15:
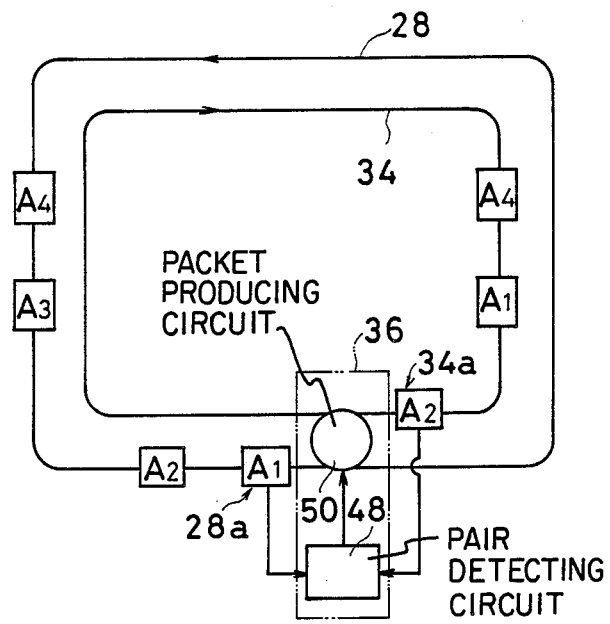
FIG. 15 and FIG. 16 are schematic views showing data flow for explaining the concept of FIG. 14 embodiment.

To be described in detail, in either of the previous embodiments in FIG. 5 and FIG. 8, as shown in FIG. 15, only one data packet pair detecting section 28a or 34a is defined on the data transmission path 28 or 34. In the case where only one data packet pair detecting section is provided on each path, as shown in FIG. 15, when data shifts are performed in the directions reverse to each other on the respective data transmission paths 28 and 34 and the data packets are circulated on the two data transmission paths 28 and 34 at the same transferring speed and in the sequence as illustrated, the same identification data, for example, "$A_1$" can never be detected simultaneously in the respective data packet pair detecting sections 28a and 34a. Accordingly, the so-called "deadlock" takes place in such a case.

Figure 16:
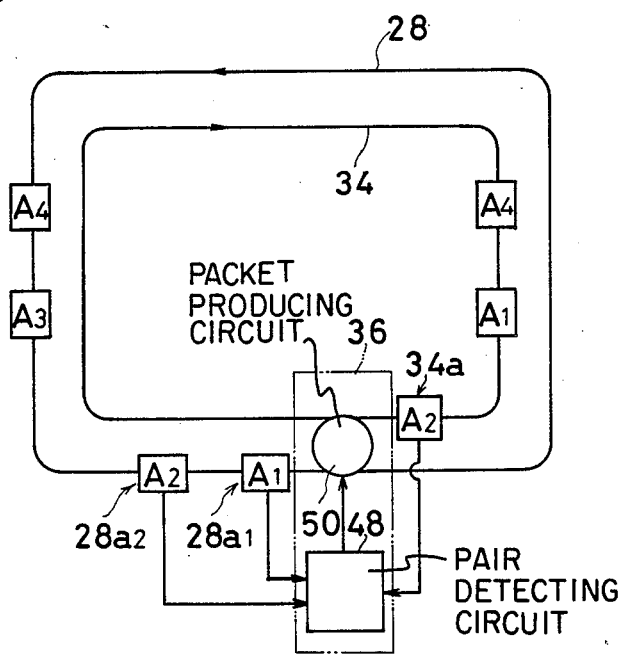

On the other hand, as shown in FIG. 16, if a plurality of data packet pair detecting sections $28a_1$, $28a_2$, --- are defined on at least one of the data transmission paths 28, the "deadlock" can be avoided effectively. Because, even if the data are transferred on the both data transmission paths 28 and 34 at the same transferring speed in the directions reverse to each other and the sequence as illustrated, an opportunity occurs without fail that when the identification data, for example, "$A_2$" is present in the data packet pair detecting section 34a of the data transmission path 34, the same identification data "$A_2$" is present in either of the other data packet pair detecting sections $28a_1$ and $28a_2$. Accordingly, the "deadlock" can be avoided by defining a plurality of data packet pair detecting sections on either of the data transmission paths.

In FIG. 14, a plurality of data packet pair detecting sections $28a_1$, $28a_2$, ---, $28a_n$ are provided on the first data transmission path 28 and one data packet pair detecting section 34a is defined on the second data transmission path 34. A plurality of identification data detecting circuits $52_1$-$52_n$ are installed corresponding to the data packet pair detecting sections $28a_1$-$28a_n$ of the first data transmission path 28, while one identification data detecting circuit 54 is installed corresponding to the data packet pair detecting section 34a of the second data transmission path 34. Then, the identification data from the identification data detecting circuits $52_1$-$52_n$ associated with the first data transmission path 28 are given individually to one of inputs of the corresponding comparing circuits $56_1$-$56_n$, respectively. The identification data from the identification data detecting circuit 54 of the second data transmission path 34 is given to the other inputs of these comparing circuits $56_1$-$56_n$ in common. Then, if a coincidence of the identification data is detected in the respective comparing circuits $56_1$-$56_n$, the control signal is given to the new data packet producing circuit 50 from the corresponding comparing circuit. In response to the coincidence signal, the new data packet producing circuit 50 produces one new data packet from the two coincident data packets, for example, likewise the case of FIG. 11 embodiment.

In addition, in the FIG. 14 embodiment, illustration and explanation are made such that the two data transmission paths 28 and 34 both transmit data in the same direction, but it is needless to say that a reverse-looped configuration may be adopted as shown in FIG. 16.

Figure 17:
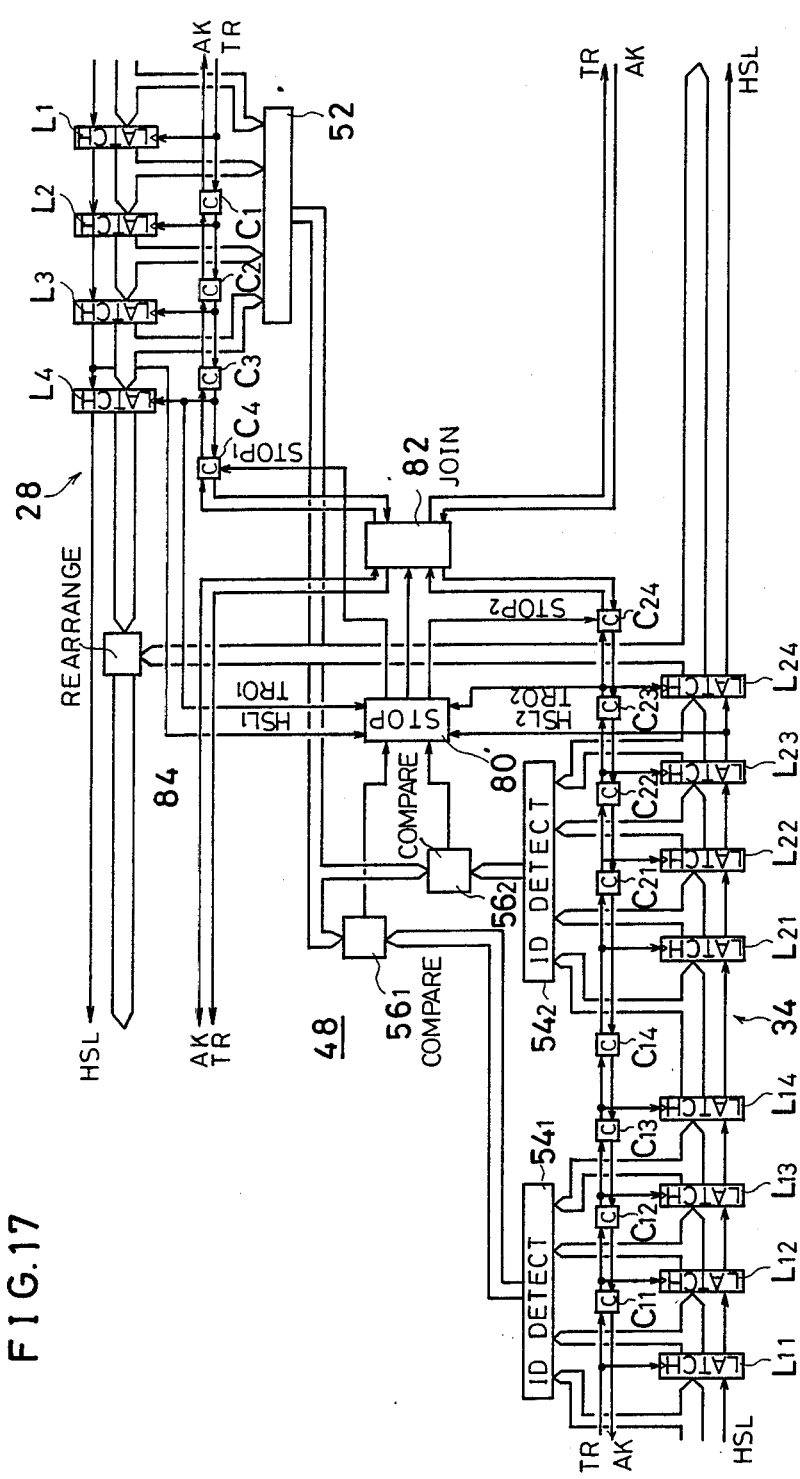
FIG. 17 is a block diagram showing one example embodying FIG. 14 embodiment, that is, FIG. 16.

FIG. 17 is a block diagram showing an example embodying FIG. 14 embodiment, that is, FIG. 16. In this FIG. 17 embodiment, one identification data detecting circuit 52 is installed in association with one of data transmission paths 28 and two identification data detecting circuits $54_1$ and $54_2$ are installed in association with the other data transmission path 34. To be detailed, the identification data detecting circuit 52 extracts the identification data from the input data to the four register $L_1$-$L_4$ constituting the first data transmission path 28. The identification data detecting circuits $54_1$ and $54_2$ respectively extract the identification data from the input data to the latch registers $L_{11}$-$L_{14}$ and the input data to the latch registers $L_{21}$-$L_{24}$ which constitute second the data transmission path 34. The identification data detected by the identification data detecting circuit 52 is given to the two comparing circuits $56_1$ and $56_2$ in common. The identification data detected by the identification data detecting circuits $54_1$ and $54_2$ are given individually to the corresponding comparing circuits $56_1$ and $56_2$, respectively.

The two comparing circuits $56_1$ and $56_2$ compare the both identification data to be given to find a matching thereof and the matching signals thereof are given to the stopping circuit 80', respectively. The stopping circuit 80' is for synchronizing the data packets to be paired which are transmitted on the two data transmission paths 28 and 34, being closely similar to the one as illustrated in FIG. 12. Then, the control signal is given to the joining circuit 82 from the stopping circuit 80' and the joining circuit 82 sends the new data packet on the first data transmission path 28 in cooperation with the packet rearranging circuit 84.

The header signal from the header signal line $HSL_1$ between the latch registers $L_3$ and $L_4$ constituting the first data transmission path 28 and the header signal from the header signal line $HSL_2$ between the latch registers $L_{23}$ and $L_{24}$ constituting the second data transmission path 34 are given to the stopping circuit 80'. Furthermore, the signals $TRO_1$ and $TRO_2$ from the C elements $C_3$ and $C_{23}$ corresponding respectively to the latch registers $L_3$ and $L_{23}$ are given thereto.

From the stopping circuit 80', the stop signals $STOP_1$ and $STOP_2$ are given to the pre-stage C elements $C_4$ and $C_{24}$ respectively and the joining control signal is given to the joining circuit 82.

Figure 18:
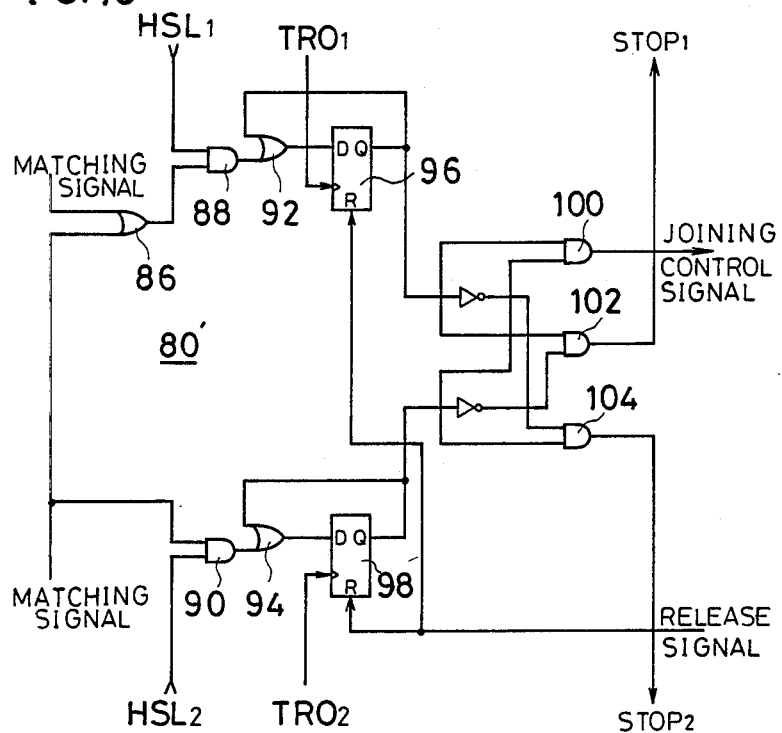
FIG. 18 is a circuit diagram showing a stopping circuit of FIG. 17 embodiment.

As shown in FIG. 18, the stopping circuit 80' comprises an OR gate 86' and two matching signals from the comparing circuits $56_1$ and $56_2$ are given to two inputs of this OR gate 86' and the output thereof is given to one of inputs of the AND gate 88. The header signal from the header signal line $HSL_1$ is given to the other input of the AND gate 88. The matching signal 1 and the header signal from the header signal line $HSL_2$ are given to two inputs of the AND gate 90. Outputs of these AND gates 88 and 90 are given as D inputs of the D flip-flops 96 and 98 through the OR gates 92 and 94, respectively. The signal $TRO_1$ from the C element $C_3$ associated with the first data transmission path 28 is given to the clock input of this D flip-flop 96 and similarly, the signal $TRO_2$ from the C element $C_{23}$ of the second data transmission path 34 is given to the clock input of the D flip-flop 98. Respective outputs Q of the D flip-flops 96 and 98 are given as D inputs of themselves through the OR gates 92 and 94.

The output Q of the D flip-flop 96 is given intact to one of inputs of each of the AND gates 100 and 102 and is also inverted by an inverter, being given to one of inputs of the AND gate 104. Also, the output Q of the D flip-flop 98 is given intact to the other inputs of the AND gates 100 and 104 and is also inverted by an inverter, being given to the other input of the AND gate 102. The output of the AND gate 102 is given to the C element $C_4$ of the first data transmission path 28 as a stop signal $STOP_1$ and the output of the AND gate 104 is given to the C element $C_{24}$ of the second data transmission path 34 as a stop signal $STOP_2$. Furthermore, the output of the AND gate 100 is given to the joining circuit 82 as a joining control signal.

Also, the stop release signal is given to the reset inputs of the D flip-flops 96 and 98.

Figure 13:
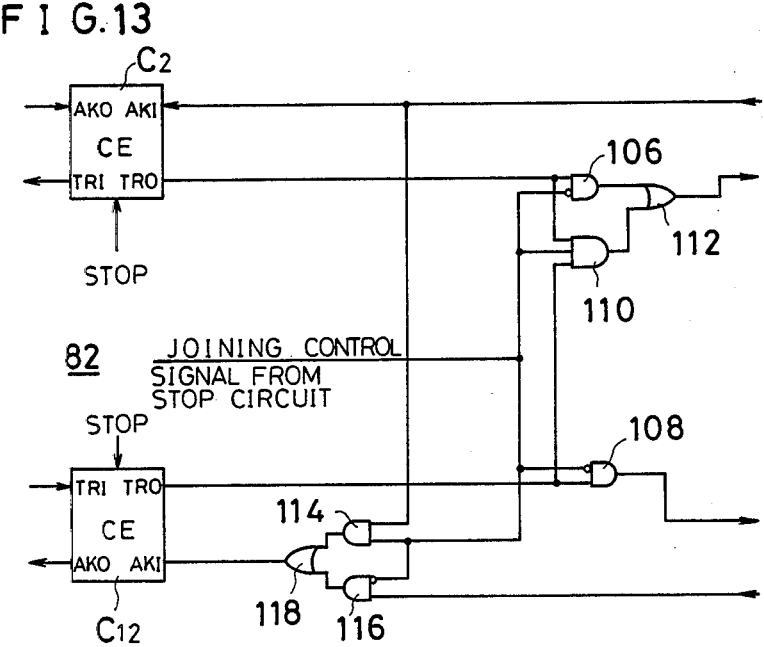
FIG. 13 is a circuit diagram showing one example of a joining circuit of FIG. 11 embodiment.

The joining circuit 82 and the data packet rearranging circuit 84 are similar to the ones as illustrated in FIG. 13.

When the header of the data packet is transferred to the latch register $L_3$ of the first data transmission path 28, the header signal line $HSL_1$ goes to the high level and at this time, if the high-level matching signal is obtained from the comparing circuit $56_1$ or $56_2$ comprised in the data packet pair detecting circuit 48, two inputs of the AND gate 88 of the stopping circuit 80' both go to the high level and D inputs of the D flip-flop 96 go to the high level. At this time, the signal $TRO_1$ from the C element $C_3$ goes to the high level and D flip-flop 96 is set and the output Q thereof goes to the high level. Also, when the header is transferred to the latch register $L_{23}$ comprised in the second data transmission path 34, the header signal line $HSL_2$ goes to the high level and at this time, if the matching signal is obtained from the comparing circuit $56_2$, the D flip-flop 98 is set in response to the signal $TRO_2$ from the C element $C_{23}$. This means that when the headers of the data packets to be paired arrive at the latch register $L_3$ of the first data transmission path 28 and the latch register $L_{23}$ of the second data transmission path 34, either of the D flip-flops 96 and 98, whichever earlier, is first set. Then, the D flip-flop which is not set is set without fail when the corresponding data arrives. Thus, the D flip-flops 96 and 98 are to hold the matching signals from the comparing circuit $56_1$ and $56_2$ of the data packet pair detecting circuit 48.

In the state that one of the D flip-flops 96 is set and the other D flip-flop 98 is not set yet, that is, in the state that the corresponding header does not arrive yet at the latch register $L_{23}$ of the second data transmission path 34, two inputs of the AND gate 102 of the stopping circuit 80' both go to the high level and accordingly, the stop signal $STOP_1$ to the terminal $T_6$ (FIG. 7) of the C element $C_4$ goes to the high level. Then, this C element $C_2$ is placed in the stopped state.

In reverse, in the state that the D flip-flop 98 is set and the D flip-flop 96 is not set, that is, in the state that the corresponding header does not arrive yet at the first data transmission path 28, the stop signal $STOP_2$ is outputted from the AND gate and consequently data transmission on the second data transmission path 34 is stopped.

In the state that the two flip-flops 96 and 98 are both set, that is, in the state that the corresponding headers have both arrived at the latch registers $L_3$ and $L_{23}$, one of inputs of each of the AND gates 102 and 104 goes to the low level and the stop signals $STOP_1$ and $STOP_2$ both go to the low level. Responsively, two inputs of the AND gate 100 both go to the high level and the high-level joining control signal is outputted to the joining circuit 82. Accordingly, one of inputs of the AND gate 114 (FIG. 13) comprised in the joining circuit 82 goes to the high level and in reverse, one of inputs of the AND gate 116 goes to the low level. Accordingly, the signal AKO not from the C element of the second data transmission path 34 but from the C element comprised in the first data transmission path 28 is outputted from the OR gate 118 (FIG. 13) and this signal is given as the signal AKI of the C element $C_{24}$ of the second data transmission path 34. At the same time, one of inputs of the AND gate 108 (FIG. 13) goes to the low level and the signal TRO to the C element of the pre-stage from the C element $C_{24}$ goes to the low level. Also, since the joining control signal is of the high level, the output of the AND gate 110 is enabled as an input of the OR gate 112 of the joining circuit 82 (FIG. 13). Accordingly, when the both signals $TRO_1$ and $TRO_2$ of the C element $C_4$ of the first data transmission path 34 are of the high level, the high-level signal TRO is given to the pre-stage C element of the first data transmission path 28 from the OR gate 112. Accordingly, thereafter the data packet of the second data transmission path 34 is given to the packet rearranging circuit 84 installed on the first data transmission path 28, disappearing from the second data transmission path 34.

Rearrangement of the data packets is performed in the data packet rearranging circuit 84 and therefrom a new data packet is brought onto the first data transmission path 28 and thereafter the high-level stop release signal is given to the stopping circuit 80' and the D flip-flops 96 and 98 are both reset and accordingly, the new data packet producing circuit 50 is disabled. Thus, a matching of the data packets to be paired is detected and one new data packet is produced.

Figure 19:
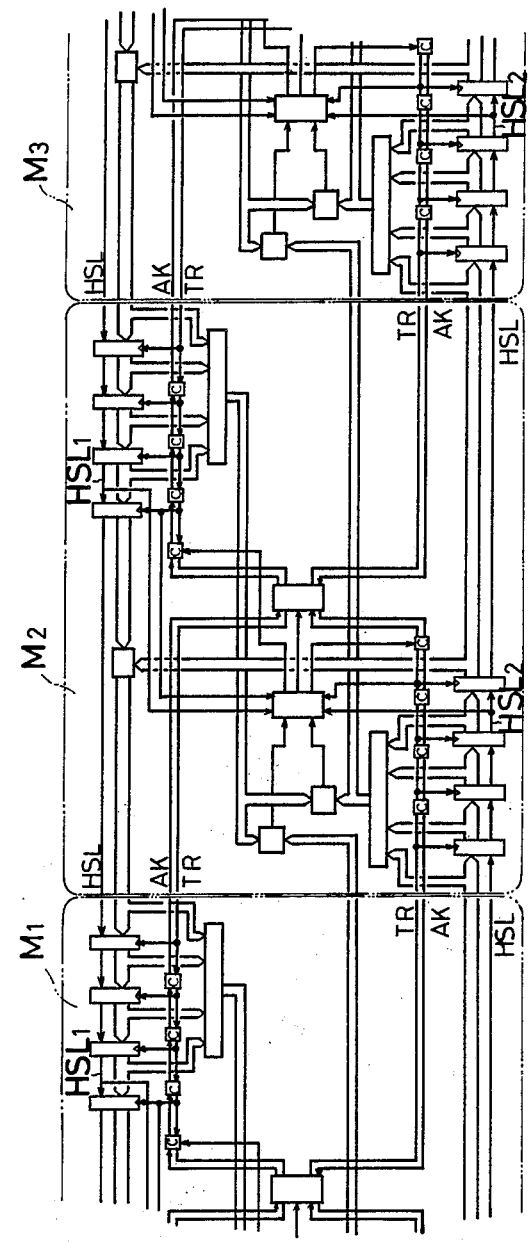
FIG. 19 is a block diagram showing another example embodying FIG. 14 embodiment, that is, FIG. 16.
Figure 20:
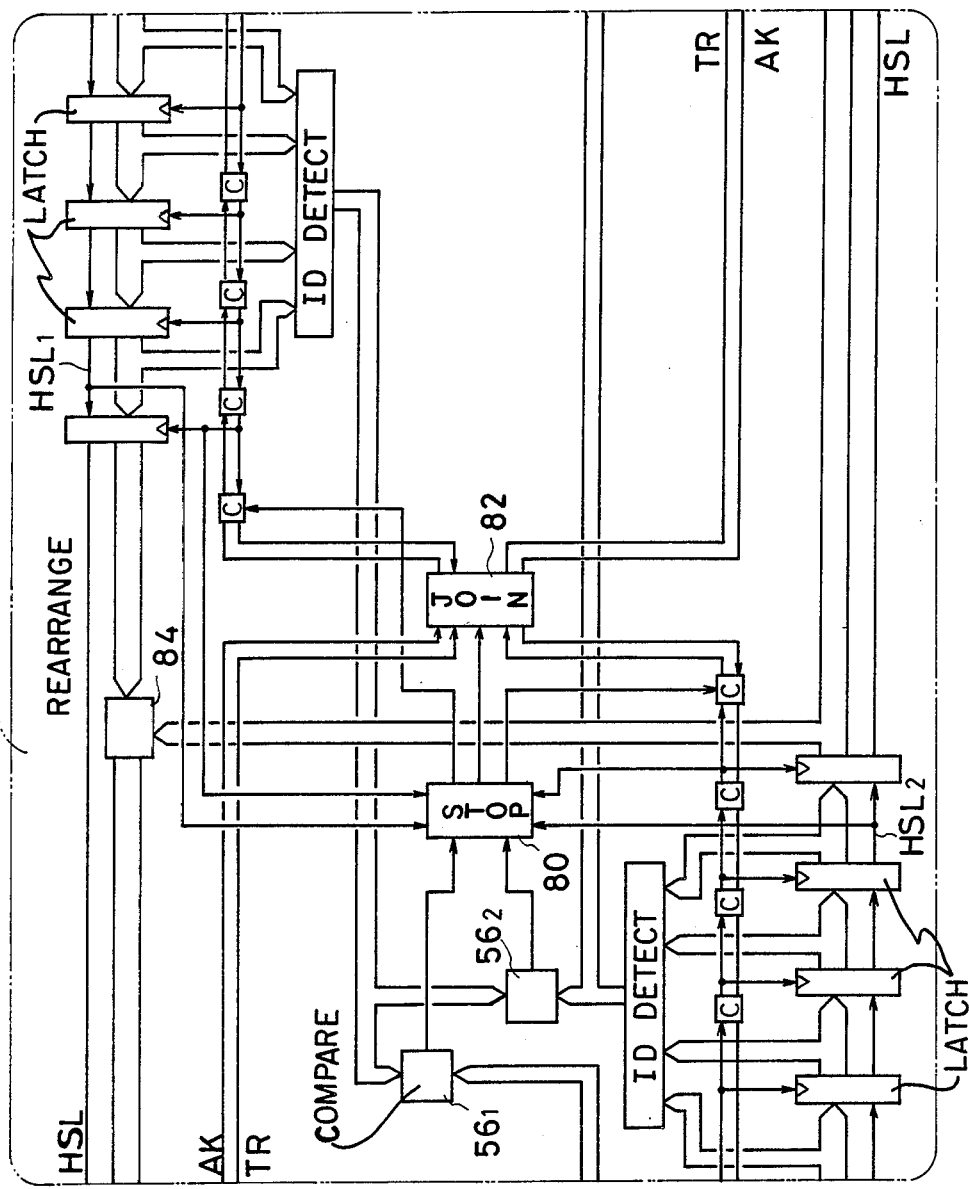
FIG. 20 is a block diagram showing one basic module used for FIG. 19 embodiment.

FIG. 19 show a modification of FIG. 17 embodiment, which is similarly an example embodying FIG. 14 embodiment, that is FIG. 16. This embodiment is constituted by connecting a plurality of basic modules $M_1$, $M_2$, $M_3$, in a cascade fashion. FIG. 20 shows a basic module M. Since the basic module M resembles closely to the circuit in FIG. 17, detailed description thereon is omitted here. In this case, the identification data can be extracted from two different data packet pair detecting sections of the second data transmission path 34 by two identification data detecting circuits.

Aiming at a certain basic module $M_2$ a coincidence is obtained in the comparing circuit $56_2$ (FIG. 20) when the two data packets to be paired are both transferred to that module $M_2$. On the other hand, a coincidence is obtained in the comparing circuit $56_1$ when the data packet on the first data transmission path (upper data transmission path in the figure) among the two data packets to be paired exists in that module $M_2$ and the data packet on the second data transmission path (lower data transmission path in the figure) exists in the module M next thereto (left side in the figure). This means that the data packet existing in the four latch registers constituting the upper data transmission path is made to wait until the counterpart data packet arrives at that module $M_2$ when the counterpart data packet existing on the lower data transmission path is transferred into the eight-stage latch registers comprising the adjacent module. In reverse, the data packet existing on the lower data transmission path is made to wait until the counterpart data packet arrives at that module $M_2$ only when the counterpart data packet is transferred into the same module $M_2$.

Thus, in accordance with FIG. 19 embodiment, two data packets exist in two data packet pair detecting sections of the lower data transmission path and one data packet exists in one data packet pair detecting section of the upper data transmission path are compared only by connecting a plurality of basic modules $M_1$, $M_2$, $M_3$, in a cascade fashion and likewise the case of FIG. 17, the "deadlock" due to the "pass-each-other" of data can be eliminated completely.

Figure 21:
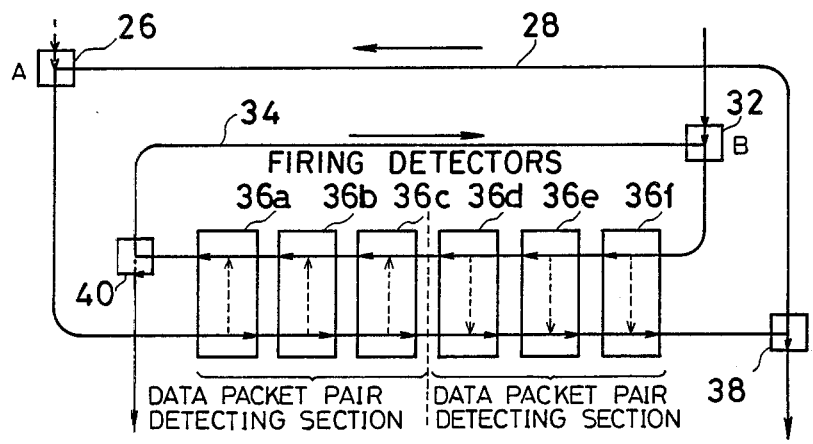
FIG. 21 is a schematic block diagram showing the other embodiment in accordance with the present invention.

FIG. 21 is a schematic block diagram showing still another embodiment in accordance with the present invention. Likewise the previous embodiment, this embodiment comprises the first and the second loop-shaped data transmission paths 28 and 34 which are constituted by the self-running type shift registers respectively. As shown in FIG. 1, different data packets are inputted to the first loop-shaped data transmission path 28 and the second loop-shaped data transmission path 34 through the joining parts 26 and 32. Then, the data packets are transmitted respectively on the first and the second data transmission paths 28 and 34 in the directions reverse to each other.

A plurality of (as shown in FIG. 1) firing detecting parts 36a, 36b, 36c, 36d, 36e and 36f are installed in connection to these first and the second data transmission paths 28 and 34. As described above, the respective firing part 36a–36f find the data packets to be paired from among the data packets circulated on the first and the second data transmission paths 28 and 34 and produce one new data packet from the two data packets.

To be detailed, in the three firing detecting parts 36a–36c located in the range as shown by a section X in FIG. 21, the data packet circulated on the first data transmission path 28 from left to right and the data packet circulated on the second data transmission path 34 from right to left are compared and a new data packet is produced respectively. Then, the new data packet produced by these firing detecting parts 36a–36c is transmitted toward the branching part 40 installed on the second data transmission path 34, being extracted from this branching part 40. On the other hand, in the three firing detecting parts 36d–36f installed in a section Y, one new data packet is produced respectively from the data packets circulated on the two data transmission paths 28 and 34. The new data packet produced in these firing detecting parts 36d-36f are transmitted from left to right on the first data transmission path 28, reaching the branching part 38. Then, such a new data packet is extracted from this branching part 38.

Thus, a total of two new data packet extracting parts, one on each of the data transmission paths 28 and 34, are installed and the firing detecting parts 36a-36f are divided into the section X and the section Y at the centers thereof. Then, the new data packet produced in the section X is made to join the second data transmission path 34 and the new data packet produced in the section Y is made to join the first data transmission path 28 respectively and thereby a new data packet can be produced in a form that one of operands is made to join the data transmission path nearer to the branching part 38 or 40 among the two data transmission paths.

Figure 22B:
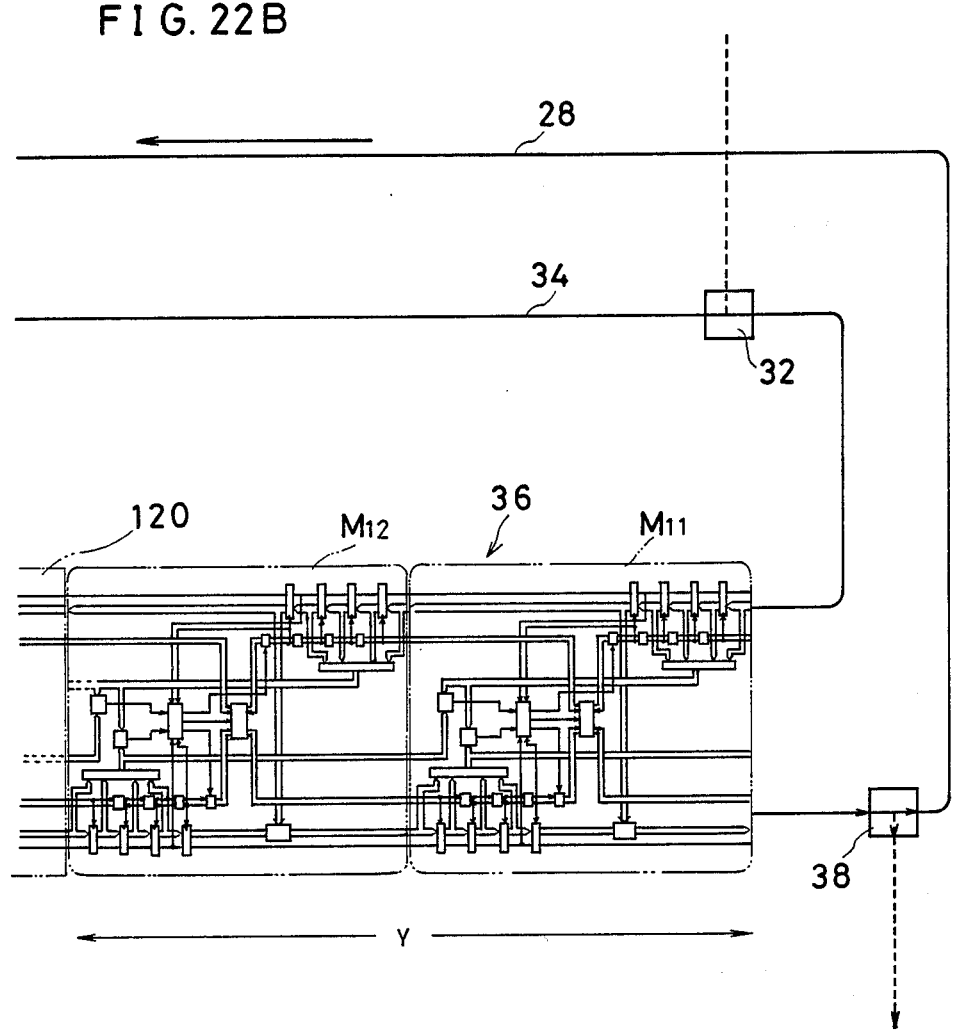

FIG. 22 shows an example embodying the system in FIG. 21. This embodiment is constituted by connecting a plurality of basic modules $M_{11}$, $M_{12}$ and $M_{21}$, $M_{22}$ in a cascade fashion, which constitute the firing detecting part 36 respectively.

One basic module M may be the same as the one as shown in the previous FIG. 20. This FIG. 20 shows the module $M_{21}$ or $M_{22}$ constituted as the firing detecting parts 36d-36f installed in the section Y (FIG. 21). The identification data detecting circuit 52 is installed in associated with one of the data transmission paths 28, and the identification data detecting circuit 54 is installed in association with the other data transmission path 34. This means that the identification data detecting circuit 52 extracts the identification data from the input data to the four latch registers $L_1-L_4$ constituting the data transmission path 28. The identification data detecting circuit 54 extracts the identification data from the input data to the latch registers $L_{11}-L_{14}$ constituting the data transmission path 34.

The identification data detected by the identification data detecting circuit 52 is given in common as one of inputs of each of the two comparing circuits $56_1$ and $56_2$. The identification data detected by the identification data detecting circuit comprised in the adjacent module and the identification data detected by the identification data detecting circuit 54 comprised in the same module M are given individually as the other inputs of the corresponding comparing circuits $56_1$ and $56_2$, respectively. These two comparing circuits $56_1$ and $56_2$ compare the both identification data to be given to determine a matching thereof and the matching signals are given to the stopping circuit 80', respectively.

The stopping circuit 80' is for synchronizing the data packets to be paired which are transmitted on the two data transmission paths 28 and 34. Then, the control signal is given to the joining circuit 82 from the stopping circuit 80' and the joining circuit 82 makes the new data packet join the data transmission path 28 in cooperation with the packet rearranging circuit 84.

Meanwhile, the module $M_{11}$ or $M_{12}$ constituted as the firing detecting parts 36a-36c installed in the section X as shown in FIG. 21 is also identical basically to the basic module M as shown in FIG. 20. However, these modules $M_{11}$ and $M_{12}$ both make the produced data packets join the second data transmission path 34. For this purpose, a conversion board 120 is inserted between the section X and the section Y. This conversion board 120 gives the identification data detected by the module $M_{12}$ to one of comparing circuits of the module $M_{22}$ and adjusts the directions of the signals TR, AK and the like for the C elements of the respective modules. The identification data may be given from the module $M_{22}$ to the module $M_{12}$. However, it is not preferable that the identification data are sent from the both to the both simultaneously. Because, if the same identification data is inputted to the two modules $M_{12}$ and $M_{22}$, the inputted modules $M_{12}$ and $M_{22}$ are both placed in the state of waiting arrival of the counterpart data packet to be paired and in this state, the data transmission path 28 or 34 is placed in the stopped state. Accordingly, in this embodiment, the same identification data is given only to the module belonging to the section Y from the module belonging to the section X.

Reverting to FIG. 22, when a certain basic module $M_{22}$ is aimed at, a coincidence in the comparing circuit $56_2$ (FIG. 20) is obtained when the two data packets to be paired are both transferred to that module $M_{22}$. On the other hand, a coincidence in the comparing circuit $56_1$ is obtained when the data packet on the first data transmission path (upper data transmission path in the figure) among the two data packets to be paired exists in that module $M_{22}$, but the other data packet on the second data transmission path (lower data transmission path in the figure) exists in the adjacent module $M_{12}$ with the conversion board 120 located in between (left side in the figure). More specifically, that the data packet existing in the four latch registers constituting the upper data transmission path is made to wait until the counterpart data packet arrives at the module $M_{22}$ when the counterpart data packet existing on the lower data transmission path is transferred into the eight-stage latch registers comprising the adjacent module. In reverse, the data packet existing on the lower data transmission path is made to wait until the counterpart data packet arrives at the module $M_{22}$ only when the counterpart data packet is transferred into the same module $M_{22}$.

Then, the new data packet produced by the modules $M_{11}$ and $M_{12}$ in the section X joins the second data transmission path 34, being outputted through the branching part 40. On the other hand, the new data packet produced by the Modules $M_{21}$ and $M_{22}$ in the section Y is sent to the first data transmission path 28, being outputted through the branching part 38.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus, comprising:
   a first data transmission path constituted by a self-running type shift register for transmitting a data packet containing identification data, said first data transmission path including a plurality of latching means coupled to each other in cascade fashion and the data packet being sequentially shifted into said latching means in a bit-parallel fashion;
   a second data transmission path constituted by a self-running type shift register for transmitting a data packet containing identification data, said second data transmission path including a plurality of latching means coupled to each other in cascade fashion and the data packet being sequentially shifted into said latching means in a bit-parallel fashion;

identification data detecting means coupled with said first and second data transmission paths for detecting the identification data contained in the data packets being respectively transmitted thereon, said identification data detecting means including first and second extracting means for extracting said identification data from the respective data packets being transmitted on said first and second data transmission paths;

determining means for comparing said identification data extracted by said first and second identification data extracting means to determine whether or not the data packets to be paired are transmitted on said first and second data transmission paths; and new data packet producing means coupled with said first and second data transmission paths for producing one new data packet in accordance with the data packets being transmitted respectively on said first and second data transmission path in response to a determination by said determining means that data packets to be paired are transmitted on said first and second transmission paths.

2. A data processing apparatus in accordance with claim 1, wherein said determining means includes means coupled to said first and second data transmission paths for making the data packet being transmitted on one of said first and second data transmission paths wait until the data packet to be paired arrives at one of said first and second extracting means in response to a detection of a specific identification data by the other of said first and second extracting means.

3. A data processing apparatus in accordance with claim 2, wherein said means for making wait comprises stopping means for stopping shift of data packets on said one of said first and second data transmission paths.

4. A data processing apparatus in accordance with claim 1, wherein the data transmitting directions of said first and second data transmission paths are reverse to each other, and said data packets are transmitted in the directions reverse to each other on said first and second data transmission paths.

5. A data processing apparatus in accordance with claim 1, wherein at least one of said first and second data transmission paths is formed in a loop fashion and said data packet is circulated on said loop-shaped data transmission path.

6. A data processing apparatus in accordance with claim 1, which further comprises a holding means for holding identification data extracted by said first and second identification data extracting means for a predetermined time.

7. A data processing apparatus in accordance with claim 6, wherein said determining means comprises a comparing means for comparing two identification data held by said holding means.

8. A data processing apparatus in accordance with claim 6, wherein said holding means includes means for holding identification data while said identification data are transmitted through plural stages of latching means on said first and second data transmission paths.

9. A data processing apparatus in accordance with claim 6, wherein said holding means comprises means for generating a first signal while said identification data are transmitted through plural stages of latching means and means, jointly responsive to said first and second extracting means and said means for generating a first signal, for generating as an output signal the same identification data extracted while said first signal persists.

10. A data processing in accordance with claim 9, wherein said generating on output signal means for outputting generates only the identification data existing in the foremost stage among said plural stages of latching means.

11. A data processing apparatus in accordance with claim 1, wherein a data word of the data packet is sequentially shifted on said latching means in a bit-parallel fashion.

12. A data processing apparatus in accordance with claim 11, wherein a plurality of said determining means are defined on at least one of data transmission paths and at least one said determining means is defined on the other data transmission path.

13. A data processing apparatus in accordance with claim 12, wherein said determining means comprises a plurality of comparing means for comparing said identification data from respective data pockets.

14. A data processing apparatus in accordance with claim 13, wherein a plurality of said determining means are installed on said other data transmission path and said determining means on said other data transmission path comprise a plurality of comparing means for comparing said identification data.

15. A data processing apparatus in accordance with claim 1, wherein said new data packet producing means comprises a joining means which makes a part or whole of a data packet joining one of said first and second data transmission paths.

16. A data processing apparatus in accordance with claim 15, wherein a data word of the data packet is sequentially shifted on said latching means in a bit-parallel fashion and specific stages of latching means are defined as positions of producing said new data packets on said first and second data transmission paths, and said joining means comprises means for forming a new data packet in a manner that a part or whole of the data packet on one of data transmission paths joins the downstream side of said specific stages of latching means of the other data transmission path.

17. A data processing apparatus in accordance with claim 16, wherein said new data packet producing means comprises stopping means for stopping transmission of one data packet which is transmitted to said specific stages of latching means of one of said first and second data transmission paths faster than the other of said data packets to be paired, when two data packets to be paired are determined by said determining means.

18. A data processing apparatus in accordance with claim 17, wherein said new data producing means comprises means for producing said new data packet when the other one of said data packets to be paired which is transmitted to said specific stages of latching means of said first or second data transmission path following passage of said stopped data packet through said specific stages of latching means of said second or first data path.

19. A data processing apparatus in accordance with claim 1, further comprising a plurality of data packet forming means in each of which are included said identification data detecting means, said determining means and said new data packet producing means, said data packet forming means being coupled to said first and second data transmission paths.

20. A data processing apparatus in accordance with claim 19, which further comprises at least two data packet extracting means coupled to said data packet forming means for extracting a new data packet formed by said data packet forming means.

21. A data processing apparatus in accordance with claim 20, wherein the new data packet formed by said data packet forming means joins said first or second data transmission path, and said data packet extracting means comprises a branching means installed on said first or second data transmission path for branching said new data packet to one of said transmission path.

22. A data processing apparatus in accordance with claim 21, wherein a plurality of said data packet forming mean are disposed and connected in a cascade fashion on said first or second data transmission path, and said branching means are disposed on both sides of said plural data packet forming means.

23. A data processing apparatus in accordance with claim 22, wherein each of said plural data packet forming means sends out a new data packet toward the nearest one among said branching means disposed on said both sides.

* * * * *